United States Patent
Haykin

(10) Patent No.: US 8,060,035 B2
(45) Date of Patent: Nov. 15, 2011

(54) TRANSMIT POWER CONTROL TECHNIQUES FOR WIRELESS COMMUNICATION SYSTEMS

(75) Inventor: Simon Haykin, Ancaster (CA)

(73) Assignee: McMaster University, Ontario (CA)

( * ) Notice: Subject to any disclaimer, the term of this patent is extended or adjusted under 35 U.S.C. 154(b) by 661 days.

(21) Appl. No.: 11/577,280

(22) PCT Filed: Oct. 13, 2005

(86) PCT No.: PCT/CA2005/001565
§ 371 (c)(1),
(2), (4) Date: Oct. 29, 2008

(87) PCT Pub. No.: WO2006/039803
PCT Pub. Date: Apr. 20, 2006

(65) Prior Publication Data
US 2009/0047916 A1    Feb. 19, 2009

Related U.S. Application Data

(60) Provisional application No. 60/617,639, filed on Oct. 13, 2004, provisional application No. 60/617,638, filed on Oct. 13, 2004.

(51) Int. Cl.
*H04B 17/00* (2006.01)
(52) U.S. Cl. ............ 455/115.1; 455/67.11; 455/69
(58) Field of Classification Search ............ 455/522, 455/69, 67.11–67.15, 115.1–115.4; 370/241
See application file for complete search history.

(56) References Cited

U.S. PATENT DOCUMENTS

| 5,768,268 | A  | * | 6/1998  | Kline et al. |         |
|-----------|----|---|---------|----------------|---------|
| 6,052,605 | A  | * | 4/2000  | Meredith et al. |        |
| 6,084,919 | A  | * | 7/2000  | Kleider et al. |         |
| 6,130,907 | A  | * | 10/2000 | Chen |                 |
| 6,714,605 | B2 | * | 3/2004  | Sugar et al. |           |
| 7,020,482 | B2 | * | 3/2006  | Medvedev et al. | 455/522 |
| 2002/0061031 | A1 | * | 5/2002 | Sugar et al. |           |
| 2003/0086514 | A1 | * | 5/2003 | Ginis et al. | 375/346 |
| 2003/0128658 | A1 | * | 7/2003 | Walton et al. |          |
| 2003/0157932 | A1 | * | 8/2003 | Chitrapu |              |
| 2003/0181213 | A1 | * | 9/2003 | Sugar et al. |           |
| 2003/0198200 | A1 | * | 10/2003 | Diener et al. |        |
| 2004/0009781 | A1 | * | 1/2004 | Andrews et al. |        |

(Continued)

FOREIGN PATENT DOCUMENTS

WO   WO03049319   *   6/2003

(Continued)

OTHER PUBLICATIONS

Search Report dated Feb. 13, 2006 in respect of International PCT Application No. PCT/CA2005/001562.

(Continued)

*Primary Examiner* — Lana N Le
(74) *Attorney, Agent, or Firm* — Clark Hill PLC

(57) ABSTRACT

Methods and systems of controlling transmit power in a multi-user wireless communication system is provided, A transmit power, level for a transmitter is determined according to an algorithm based in communication theory, such as an iterative water-filling procedure, which takes into account an assumption of transmit behaviours of transmitters in the communication system. Actual transmit behaviours of transmitters in the communication system are monitored using a learning algorithm to determine whether any transmitters exhibit transmit behaviours which are not consistent with the assumption.

27 Claims, 4 Drawing Sheets

U.S. PATENT DOCUMENTS

| | | | |
|---|---|---|---|
| 2004/0028003 A1* | 2/2004 | Diener | |
| 2004/0028123 A1* | 2/2004 | Sugar et al. | |
| 2004/0047324 A1* | 3/2004 | Diener | |
| 2004/0092281 A1* | 5/2004 | Burchfiel | |
| 2004/0152423 A1* | 8/2004 | Reznik | 455/67.11 |
| 2004/0198304 A1* | 10/2004 | Wang | |
| 2005/0018611 A1* | 1/2005 | Chan et al. | 370/241 |
| 2009/0197632 A1* | 8/2009 | Ghosh et al. | 455/522 |
| 2009/0232036 A1* | 9/2009 | Marx | 370/311 |

FOREIGN PATENT DOCUMENTS

| | | | |
|---|---|---|---|
| WO | WO03049466 | * | 6/2003 |
| WO | WO03063384 | * | 7/2003 |
| WO | WO03090037 | * | 10/2003 |
| WO | WO03092231 | * | 11/2003 |

OTHER PUBLICATIONS

Search Report dated Nov. 22, 2005 in respect of International PCT Application No. PCT/CA2005/001565.

Supplementary Search Report dated Nov. 28, 2008 issued in respect of European Application No. 05794586.7.

Supplementary Search Report dated Nov. 28, 2008 issued in respect of European Application No. 05797181.4.

"Extrapolation algorithms for discrete signals with application in spectral estimation", Jain A.; Ranganath, S., Acoustics, Speech and Signal Processing [see also IEEE Transactions on Signal Processing] vol. 29, Issue 4, Aug. 1981, pp. 830-845 (entire document).

"Singular value decomposition, singular vectors, and the discrete prolate spheroidal sequences", Zhou, Y.; Rushforth, C.; Frost, R.; Acoustics, Speech, and Signal Processing, IEEE International Conference on ICASSP '84. vol. 9, Part 1, Mar. 1984, pp. 92-95 (entire document).

Haykin: "Cognitive Radio: Brain Empowered Wireless Communications", IEEE Journal on Selected Areas in Communications, vol. 23, No. 2; Feb. 2005, pp. 201-220 (whole document).

Yu, et al.: "Distributed Multiuser Power Control for Digital Subscriber Lines"; IEEE Journal on Selected Areas in Communications, vol. 20, No. 5; Jun. 2002, pp. 1105-1115 (whole document).

Ye et al.: "Optimized Signalling for MIMO Interference Systems with Feedback"; IEEE Transactions on Signal Processing, vol. 51, No. 11; Nov. 2003, pp. 2839-2848 (whole document).

Scutari G. et al.: "On the Maximum Achievable Rates in Wireless Meshed Networks: Centralized versus Decentralized Solutions", IEEE International Conference on Acoustics, Speech and Signal Processing, vol. 4; May 17-21, 2004; pp. iv-573-iv 576 vol. 4 (whole document).

Weiss, Jondral: "Spectrum pooling: an innovative strategy for the enhancement of spectrum efficiency", IEEE Communications Magazine, vol. 42, No. 3, Mar. 2004, pp. S8-S14, XP011108909 Piscataway, US.

Thomson: "Spectrum estimation and harmonic analysis" Proceedings of the IEEE, vol. 70, No. 9, Sep. 1982 pp. 1055-1096, XP000909959 New York, US.

"SDR Technology Implementation for the Cognitive Radio", Bruce Fette, General Dynamics, 2003, pp. 1-32.

"Comments of the Wireless Communications Association International, Inc.", Paul J. Sinderbrand; Before the Federal Communications Commission, Washington, D.C., Apr. 5, 2004, 33 pages.

"Cognitive Radio Technologies in the Commercial Area", Bill Lane, FCC Cognitive Radio Workshop, Apr. 19, 2003, pp. 1-13.

"Beyond the Outer Limits—XG Next Generation Communications", Preston Marshall, FCC Cognitive Radio Conference, Apr. 19, 2003, pp. 1-12.

"Cognitive Radio, An Integrated Agent Architecture for Software Defined Radio", Joseph Mitola III, Royal Institute of Technology, May 8, 2000, 313 pages.

"Frequency Agile Spectrum Access Technologies", Mark McHenry, FCC Workshop on Cognitive Radios, May 19, 2003, pp. 1-25.

SmartRRM for WLANS, InterDigital, Brochure, © 2004, 2 pages.

Jeff Foerster, Evan Green, Srinivasa Somayazulu, David Leeper, "Ultra-Wideband Technology for Short- or Medium-Range Wireless Communications", Intel Technology Journal, Q2, 2001, pp. 1-11.

SPECTRUM Policy and Technology, Spectrum Access and the Promise of Cognitive Radio Technology; May 19, 2003, 11 pages. http://webarchive.org/web/20040714082438/http://www.mrc-cbu.cam.ac.uk (downloaded Aug. 31, 2010).

* cited by examiner

TRANSMIT POWER CONTROL TECHNIQUES FOR WIRELESS COMMUNICATION SYSTEMS

CROSS-REFERENCE TO RELATED APPLICATIONS

This application claims the benefit of U.S. Provisional Patent Application Ser. Nos. 60/617,638 and 60/617,639, both filed on Oct. 13, 2004.

This application also claims the benefit of, and is a National Phase Entry of, PCT Application Serial No. PCT/CA2005/001565, filed Oct. 13, 2005, which in turn claims the benefit of the above provisional patent applications.

The entire contents of these related patent applications are incorporated in their entirety herein by reference.

FIELD OF THE INVENTION

This invention relates generally to wireless communications and, in particular, to controlling transmitter power in wireless communication systems.

BACKGROUND

In the field of wireless communications, cognitive radio is viewed as a novel approach for improving the utilization of a precious natural resource, the radio electromagnetic spectrum.

The cognitive radio, built on a software-defined radio, is defined as an intelligent wireless communication system that is aware of its environment and uses the methodology of understanding-by-building to learn from the environment and adapt to statistical variations in the input stimuli, with two primary objectives in mind, namely highly reliable communication whenever and wherever needed, and efficient utilization of the radio spectrum.

Attaining these objectives in cognitive radio may therefore involve controlling communication equipment in such a manner as to provide reliable communications while reducing adverse effects on other communication equipment. Conventional communication techniques, however, typically exploit available communication resources for the benefit of particular communication equipment, one particular user for instance, without substantial consideration of impact on other communication equipment.

SUMMARY OF THE INVENTION

According to one broad aspect of the invention, there is provided a method of controlling transmit power in a multi-user wireless communication system. The method involves determining a transmit power level for a transmitter in the wireless communication system according to a communication theory algorithm. The communication theory algorithm is based on an assumption of behaviours of transmitters in the communication system. The method also involves monitoring behaviours of the transmitters in the communication system using a learning algorithm.

In some embodiments, the communication theory algorithm comprises an iterative water-filling procedure which accounts for determined transmit power levels of the transmitter and other transmitters in the communication system.

In some embodiments, the iterative water-filling procedure involves initializing a transmit power distribution across n transmitters, performing water-filling for the transmitter to determine a transmit power level for a target data transmission rate of the transmitter subject to a power constraint for the transmitter and a level of interference, the level of interference comprising a noise floor plus either initialized transmit power levels or previously determined transmit power levels for the other transmitters, determining whether a data transmission rate of the transmitter is greater than or less than a target data transmission rate of the transmitter, and if so, adjusting the determined transmit power level for the transmitter, determining whether a target data transmission rate of at least one of the n transmitters is not satisfied by a respective adjusted transmit power level for the at least one transmitter, and repeating the operation of performing water-filling where the target data transmission rate of at least one of the n transmitters is not satisfied.

In some embodiments, the operations of performing, determining whether a data transmission rate of a transmitter is greater than or less than a target transmission rate, and adjusting are repeated for each of the other transmitters.

In some embodiments, determining whether the target data transmission rate of at least one of the n transmitters is not satisfied comprises determining whether the target data transmission rates of all of the n transmitters are not satisfied, and repeating the operation of performing water-filling comprises repeating the operation of performing water-filling where the target data transmission rates of all of the n transmitters are not satisfied.

In some embodiments, adjusting comprises reducing the determined transmit power level for the transmitter where the data transmission rate of the transmitter is greater than the target data transmission rate of the transmitter.

In some embodiments, where the data transmission rate of the transmitter is less than the target data transmission rate of the transmitter, adjusting comprises determining whether increasing the determined transmit power level of the transmitter would violate an interference level limit, and increasing the determined transmit power level of the transmitter where increasing the determined transmit power level of the transmitter would not violate an interference level limit.

In some embodiments, the interference level limit comprises an interference temperature limit.

In some embodiments, determining whether the target data transmission rate of at least one of the n transmitters is not satisfied comprises determining whether the data transmission rate differs from the target data transmission rate by a predetermined amount.

In some embodiments, monitoring comprises determining whether the behaviours of the transmitters are consistent with the assumption of behaviours, and the method further comprises generating an alert where the behaviour of one or more of the transmitters is not consistent with the assumption.

In some embodiments, the method further comprises taking corrective action affecting the one or more of the transmitters responsive to the alert.

In some embodiments, the method further comprises detecting at least one spectrum hole, and determining comprises determining a transmit power level for the transmitter for transmission within the at least one spectrum hole.

In some embodiments, the method further comprises predicting subsequent availability of the at least one spectrum hole, and repeating the operations of determining and monitoring when the at least one spectrum hole is predicted to become unavailable.

In some embodiments, the method further comprises detecting a further spectrum hole, detecting an increase in interference in the at least one spectrum hole, and repeating the operations of determining and monitoring to control transmit power levels for the transmitter for transmission within the further spectrum hole responsive to detecting an increase in interference in the at least one spectrum hole.

In some embodiments, the method further comprises determining a position of the transmitter relative to other transmitters in the communication system.

In some embodiments, the method further comprises determining a multi-user path loss matrix of the operating environment of the transmitter based on the determined position of the transmitter relative to the other transmitters.

In some embodiments, the learning algorithm comprises a regret-conscious learning algorithm.

In some embodiments, the learning algorithm comprises a Lagrangian learning algorithm.

In some embodiments, the method further comprises adapting a modulation strategy for transmission of data by the transmitter where the data transmission rate of the transmitter is less than the target data transmission rate of the transmitter and increasing the determined transmit power level of the transmitter would violate an interference level limit.

In some embodiments, determining whether increasing the determined transmit power level of the transmitter would violate an interference level limit comprises determining whether increasing the determined transmit power level of the transmitter would violate an interference level limit within a spectrum hole, and the method further comprises, where the data transmission rate of the transmitter is less than the target data transmission rate of the transmitter and increasing the determined transmit power level of the transmitter would violate an interference level limit within the spectrum hole, detecting a further spectrum hole, and determining a further transmit power level for the transmitter for transmission within the new spectrum hole.

In some embodiments, a machine-readable medium stores instructions which when executed perform the method.

Another broad aspect of the invention provides a system for controlling transmit power in a multi-user wireless communication system. The system includes an input for receiving information associated with transmit behaviours of transmitters in the wireless communication system, and a processor operatively coupled to the input. The processor is configured to determine a transmit power level for a transmitter in the wireless communication system according to a communication theory algorithm, the communication theory algorithm being based on an assumption of transmit behaviours of transmitters in the communication system, and to monitor the transmit behaviours of the transmitters in the communication system using a learning algorithm.

In some embodiments, the processor is further configured to implement a cognitive radio.

In some embodiments, the communication theory algorithm comprises an iterative water-filling procedure, the iterative water-filling procedure accounting for determined transmit power levels of the transmitter and other transmitters in the communication system.

In some embodiments, the processor is configured to determine a transmit power level for the transmitter by initializing a transmit power distribution across n transmitters, performing water-filling for the transmitter to determine a transmit power level for a target data transmission rate of the transmitter subject to a power constraint for the transmitter and a level of interference, the level of interference comprising a noise floor plus either initialized transmit power levels or previously determined transmit power levels for the other transmitters, determining whether a data transmission rate of the transmitter is greater than or less than a target data transmission rate of the transmitter, and if so, adjusting the determined transmit power level for the transmitter, determining whether a target data transmission rate of at least one of the n transmitters is not satisfied by a respective adjusted transmit power level for the at least one transmitter, and repeating the operation of performing water-filling where the target data transmission rate of at least one of the n transmitters is not satisfied.

In some embodiments, the processor is further configured to determine whether the target data transmission rate of at least one of the n transmitters is not satisfied by determining whether the target data transmission rates of all of the n transmitters are not satisfied, and to repeat the operation of performing water-filling where the target data transmission rates of all of the n transmitters are not satisfied.

In some embodiments, the processor is configured to adjust the determined transmit power level by reducing the determined transmit power level for the transmitter where the data transmission rate of the transmitter is greater than the target data transmission rate of the transmitter.

In some embodiments, the processor is further configured to adjust the determined transmit power level by determining whether increasing the determined transmit power level of the transmitter would violate an interference level limit, where the data transmission rate of the transmitter is less than the target data transmission rate of the transmitter, and increasing the determined transmit power level of the transmitter where increasing the determined transmit power level of the transmitter would not violate an interference level limit.

In some embodiments, the processor is configured to determine whether the target data transmission rate of at least one of the n transmitter is not satisfied by determining whether the data transmission rate differs from the target data transmission rate by a predetermined amount.

In some embodiments, the processor is configured to monitor the transmit behaviours of the transmitters by determining whether the behaviours of the transmitters are consistent with the assumption of behaviours, and the processor is further configured to generate an alert where the behaviour of one or more of the transmitters is not consistent with the assumption.

In some embodiments, the processor is further configured to detect at least one spectrum hole, and to determine a transmit power level by determining a transmit power level for the transmitter for transmission within the at least one spectrum hole.

In some embodiments, the at least one spectrum hole comprises a plurality of spectrum holes, and the processor is configured to determine a transmit power level by determining a set of transmit power levels comprising multiple transmit power levels for transmission within respective ones of the plurality of spectrum holes.

In some embodiments, the processor is further configured to predict subsequent availability of the at least one spectrum hole, and to repeat the operations of determining and adapting when the at least one spectrum hole is predicted to become unavailable.

In some embodiments, the processor is further configured to detect a further spectrum hole, to detect an increase in interference in the at least one spectrum hole, and to repeat the operations of determining and adapting to control transmit power levels for the transmitter for transmission within the further spectrum hole responsive to detecting an increase in interference in the at least one spectrum hole.

In some embodiments, the processor is further configured to determine a position of the transmitter relative to the other users.

In some embodiments, the system also includes a Global Positioning System (GPS) receiver, and the processor is operatively coupled to the GPS receiver and configured to determine a position of the transmitter based on signals received by the GPS receiver.

In some embodiments, the processor is further configured to determine a multi-user path loss matrix of the operating environment based on the determined position of the transmitter relative to the other transmitters.

In some embodiments, the processor is further configured to adapt a modulation strategy for transmission of data by the transmitter where the data transmission rate of the transmitter is less than the target data transmission rate of the transmitter and increasing the determined transmit power level of the transmitter would violate an interference level limit.

In some embodiments, the processor is configured to determine whether increasing the determined transmit power level of the transmitter would violate an interference level limit by determining whether increasing the determined transmit power level of the transmitter would violate an interference level limit within a spectrum hole, and the processor is further configured to detect a further spectrum hole and to determine a further transmit power level for the transmitter for transmission within the further spectrum hole, where the data transmission rate of the transmitter is less than the target data transmission rate of the transmitter and increasing the determined transmit power level of the transmitter would violate an interference level limit within the spectrum hole.

In some embodiments, the communication system comprises a Multiple-Input Multiple-Output (MIMO) communication system.

In some embodiments, the system is implemented in at least one of a mobile communication device and a base station in the communication system.

In some embodiments, the communication system is configured for communication of Orthogonal Frequency Division Multiplexing (OFDM) signals.

In some embodiments, the system is implemented in a plurality of communication devices, each of the plurality of communication devices comprising a transmitter and a processor configured to determine a transmit power level for the transmitter according to the communication theory algorithm, and to monitor transmit behaviours of others communication devices of the plurality of communication devices using the learning algorithm.

Other aspects and features of embodiments of the present invention will become apparent to those ordinarily skilled in the art upon review of the following description of specific illustrative embodiments of the invention.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
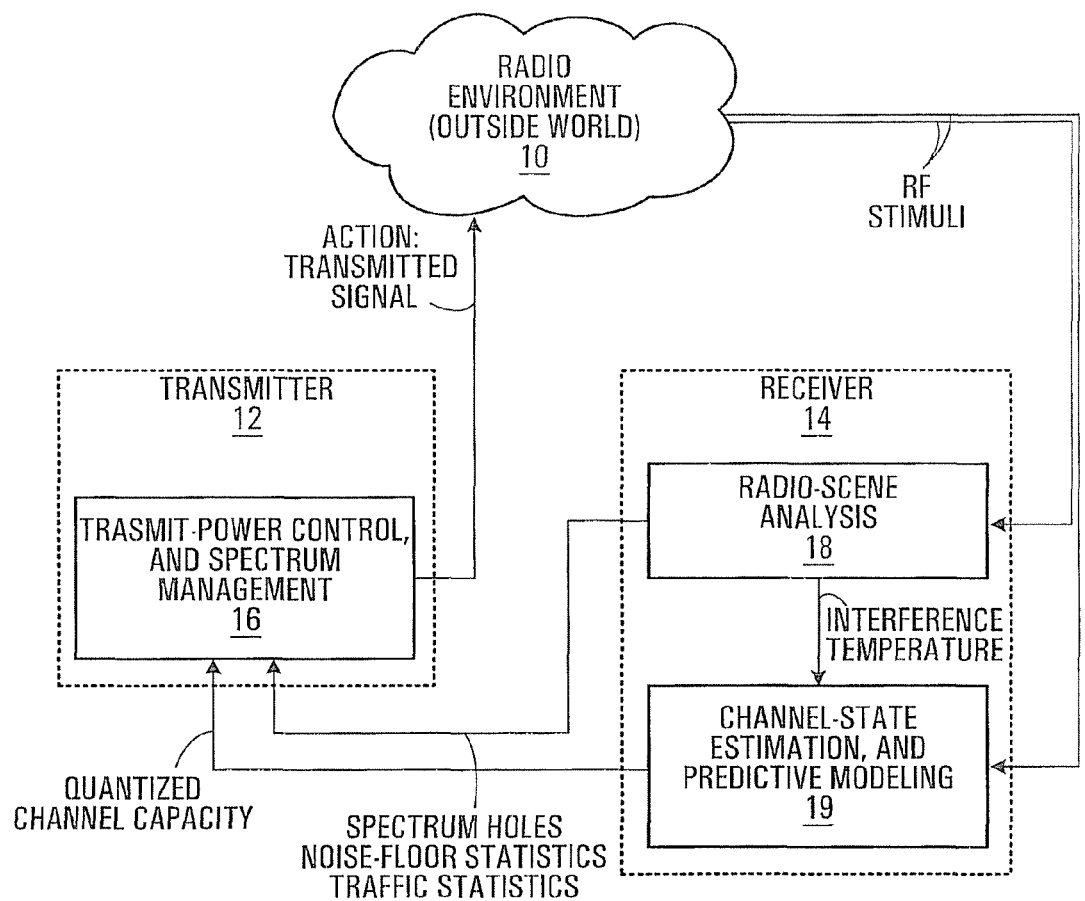
FIG. 1 is a block diagram representation of a cognitive cycle.

The electromagnetic radio spectrum is a natural resource, the use of which by transmitters and receivers is licensed by governments. In November 2002, the Federal Communications Commission (FCC) published a Report (ET Docket No. 02-135) prepared by the Spectrum-Policy Task Force aimed at improving the way in which this precious resource is managed in the United States of America. Among the Task Force Major Findings and Recommendations, the second Finding on page 3 of the Report is rather revealing in the context of spectrum utilization:

In many bands, spectrum access is a more significant problem than physical scarcity of spectrum, in large part due to legacy command-and-control regulation that limits the ability of potential spectrum users to obtain such access.

Indeed, a scan of portions of the radio spectrum would likely find that some frequency bands in the spectrum are largely unoccupied most of the time, other frequency bands are only partially occupied, and the remaining frequency bands are heavily used.

The under-utilization of the electromagnetic spectrum leads us to think in terms of "spectrum holes". A spectrum hole may be generally considered as a band of frequencies assigned to a primary user, which at a particular time and specific geographic location is not being utilized by its primary user.

Spectrum utilization can be improved significantly by making it possible for a secondary user who is not being serviced to access a spectrum hole which is not being utilized by the primary user at a current time and location of the secondary user. Cognitive radio, inclusive of software-defined radio, may offer a means to promote the efficient use of the spectrum by exploiting the existence of spectrum holes.

At this point, it may be useful to consider what is meant by "cognitive radio". The Encyclopedia of Computer Science (A. Ralston and E. D. Reilly, Encyclopedia of Computer Science, pp. 186-186, Van Nostrand Reinhold, 1993), provides a three-point computational view of cognition:

(i) mental states and processes intervene between input stimuli and output responses;

(ii) the mental states and processes are described by algorithms; and (iii) the mental states and processes lend themselves to scientific investigations.

Moreover, it may be inferred that the interdisciplinary study of cognition is concerned with exploring general principles of intelligence through a synthetic methodology which is generally termed learning by understanding. Putting these ideas together and bearing in mind that cognitive radio is aimed at improved utilization of the radio spectrum, the following definition for cognitive radio may be appropriate:

Cognitive radio is an intelligent wireless communication system that is aware of its surrounding environment (i.e., outside world), and uses the methodology of understanding-by-building to learn from the environment and adapt its internal states to statistical variations in incoming RF stimuli by making corresponding changes in certain operating parameters (e.g., transmit-power, carrier-frequency, and modulation strategy) in real-time, with two primary objectives in mind:

highly reliable communications whenever and wherever needed, and efficient utilization of the radio spectrum.

Six key words stand out in the above definition: awareness, intelligence, learning, adaptivity, reliability, and efficiency. The awareness capability of cognitive radio, for example, may embody awareness with respect to transmitted waveforms, radio frequency (RF) spectrum, communication network, geography, locally available services, user needs, language, situation, and security policy.

Implementation of this far-reaching combination of capabilities is indeed feasible today, thanks to the advances in digital signal processing, networking, machine learning, computer software, and computer hardware.

In addition to these cognitive capabilities, a cognitive radio is also endowed with reconfigurability. This latter capability is provided by a platform known as software-defined radio, upon which a cognitive radio is built. Software-defined radio (SDR) is a practical reality today, thanks to the convergence of digital radio and computer software technologies. Reconfigurability may provide the basis for such features as adaptation of a radio interface so as to accommodate variations in the development of new interface standards, incorporation of new applications and services as they emerge, incorporation of updates in software technology, and exploitation of flexible services provided by radio networks, for example.

For reconfigurability, a cognitive radio looks naturally to software-defined radio. For other tasks of a cognitive kind, the cognitive radio looks to signal-processing and machine-learning procedures for their implementation. The cognitive process, in accordance with embodiments of the invention, starts with the passive sensing of RF stimuli and culminates with action.

Cognitive radio may thus involve the following three on-line cognitive tasks. The following list includes some of the primary cognitive tasks associated with cognitive radio, but is no way intended to be exhaustive:

(i) operating environment or radio-scene analysis, which encompasses estimation of interference, illustratively as an interference temperature, of the radio environment and detection of spectrum holes;

(ii) channel identification, which encompasses estimation of channel-state information (CSI), and prediction of channel capacity for use by a transmitter; and (iii) transmit-power control and dynamic spectrum management.

These three tasks form a cognitive cycle, which is pictured in one basic form in the block diagram of FIG. 1. Through interaction with the RF environment 10, tasks (i) and (ii), shown at 18 and 19 in FIG. 1, would typically be carried out in a receiver 14, whereas task (iii), shown in FIG. 1 at 16, is carried out in a transmitter 12.

The cognitive cycle shown in FIG. 1 pertains to a one-way communication path, with the transmitter 12 and the receiver 14 located in two different places. In a two-way communication scenario, both a receiver and a transmitter or alternatively a transceiver (i.e., a combination of transmitter and receiver) would be provided at communication equipment at each end of the communication path. All of the cognitive functions embodied in the cognitive cycle of FIG. 1 are then supported at each of a wireless communication device and a base station, for example.

From this brief discussion, it is apparent that a cognitive module in the transmitter 12 preferably works in a harmonious manner with the cognitive modules in the receiver 14. In order to maintain this harmony between the cognitive radio's transmitter 12 and receiver 14 at all times, a feedback channel connecting the receiver 14 to the transmitter 12 may be provided. Through the feedback channel, the receiver 14 is enabled to convey information on the performance of the forward link to the transmitter 12. The cognitive radio, in one implementation, is therefore an example of a feedback communication system.

One other comment is in order. A broadly-defined cognitive radio technology accommodates a scale of differing degrees of cognition. At one end of the scale, the user may simply pick a spectrum hole and build its cognitive cycle around that hole. At the other end of the scale, the user may employ multiple implementation technologies to build its cognitive cycle around a wideband spectrum hole or set of narrowband spectrum holes to provide the best expected performance in terms of spectrum management and transmit-power control, and do so in the most highly secure manner possible.

From a historical perspective, the development of cognitive radio is still at a conceptual stage, unlike conventional radio. Nevertheless, cognitive radio may have the potential for making a significant difference to the way in which the radio spectrum can be accessed with improved utilization of the spectrum as a primary objective. Indeed, given its potential, cognitive radio can be justifiably described as a disruptive, but unobtrusive technology.

Embodiments of the present invention relate to signal-processing and adaptive procedures which lie at the heart of cognitive radio. In particular, the present application discloses transmit power control techniques. Radio scene analysis in cognitive radio is described in detail in International (PCT) Patent Application Ser. No. PCT/CA2005/001562, entitled "OPERATING ENVIRONMENT ANALYSIS TECHNIQUES FOR WIRELESS COMMUNICATION SYSTEMS", filed on Oct. 13, 2005, the entire contents of which are incorporated herein by reference, and in the above-referenced U.S. Provisional Patent Application Ser. No. 60/617,638.

In the following description, multi-user cognitive radio networks are considered, with a review of stochastic games highlighting the processes of cooperation and competition that characterize multi-user networks. An iterative water-filling procedure for distributed transmit power control is then proposed. Dynamic spectrum management, which may be performed hand-in-hand with transmit power control, is also discussed.

In conventional wireless communications built around base stations, transmit power levels are controlled by the base stations so as to provide a required coverage area and thereby provide desired receiver performance. On the other hand, it may be necessary for a cognitive radio to operate in a decentralized manner, thereby broadening the scope of its applications. In such a case, some alternative control mechanism for transmit power may be desirable. One key issue to be considered is how transmit power control can be achieved at the transmitter.

A partial answer to this fundamental question lies in building cooperative mechanisms into the way in which multiple access by users to the cognitive radio channel is accomplished. The cooperative mechanisms may include, for example, any of the following:

(i) Etiquette and protocol. Such provisions may be likened to the use of traffic lights, stop signs, and speed limits, which are intended for motorists (using a highly dense transportation system of roads and highways) for their individual safety and benefits.

(ii) Cooperative ad-hoc networks. In such networks, the users communicate with each other without any fixed infrastructure.

In T. J. Shepard, "Decentralized Channel Management in Scalable Multihop Spread-Spectrum Packet Radio Networks", Ph.D. Thesis, MIT, July 1995, Shepard studies a large packet radio network using spread-spectrum modulation and a cooperative mechanism of type (ii). The only required form of coordination in the network is pairwise, between neighboring nodes (users) that are in direct communication. To mitigate interference, it is proposed that each node create a transmit-receive schedule. The schedule is communicated to a nearest neighbor only when a source node's schedule and that of the neighboring node permit the source node to transmit it and the neighboring node to receive it. Under some reasonable assumptions, simulations are presented to show that with this completely decentralized control, the network can scale to almost arbitrary numbers of nodes.

An independent and like-minded study (P. Gupta and P. R. Kumar, "The Capacity of Wireless Networks", IEEE Trans. Information Theory, Vol. 46, Issue: 2, pp. 388-404, 2000) considered a radio network consisting of n identical nodes that communicate with each other and also use a cooperative mechanism of the second type. The nodes are arbitrarily located inside a disk of unit area. A data packet produced by a source node is transmitted to a sink node (i.e., destination) via a series of hops across intermediate nodes in the network. If one bit-meter denotes one bit of information transmitted across a distance of one meter toward its destination, then the transport capacity of the network is defined as the total number of bit-meters that the network can transport in one second for all n nodes. Under a protocol model of noninterference, Gupta and Kumar derive two significant results. First, the transport capacity of the network increases with n. Second, for a node communicating with another node at a distance nonvanishingly far away, the throughput (in bits per second) decreases with increasing n. These results are consistent with those of Shepard. However, Gupta and Kumar do not consider the congestion problem identified in Shepard's work.

Through the cooperative mechanisms described under (i) and (ii) and other cooperative means, the users of cognitive radio may be able to benefit from cooperation with each other in that the system could end up being able to support more users because of the potential for an improved spectrum-management strategy.

The cooperative ad-hoc networks studied by Shepard and by Gupta and Kumar are examples of a new generation of wireless networks, which, in a loose sense, resemble the Internet. In any event, in cognitive radio environments built around ad-hoc networks and existing infrastructured networks, it is possible to find the multi-user communication process being complicated by another phenomenon, namely competition, which works in opposition to cooperation.

Basically, the driving force behind competition in a multi-user environment lies in having to operate under the umbrella of limitations imposed on available network resources. Given such an environment, a particular user may try to exploit the cognitive radio channel for self-enrichment in one form or another, which, in turn, may prompt other users to do likewise. However, exploitation via competition should not be confused with the self-orientation of cognitive radio which involves the assignment of priority to certain stimuli (e.g., urgent requirements or needs). In any event, the control of transmit power in a multi-user cognitive radio environment may operate under two stringent limitations on network resources, specifically an interference or interference-temperature limit which might be imposed by regulatory agencies or other entities, and the availability of a limited number of spectrum "holes" depending on usage.

What is described above is a multi-user communication-theoretic problem. Unfortunately, a complete understanding of multi-user communication theory is yet to be developed. Nevertheless, we know enough about two diverse disciplines, namely, information theory and game theory, for us to tackle this difficult problem in a meaningful way. However, before proceeding further, we digress briefly to introduce some basic concepts in game theory.

The transmit-power control problems in a cognitive radio environment involving multiple users may be viewed as a game-theoretic problem.

In the absence of competition, we would then have an entirely cooperative game, in which case the problem simplifies to an optimal control-theoretic problem. This simplification is achieved by finding a single cost function that is optimized by all the players, thereby eliminating the game-theoretic aspects of the problem. So, the issue of interest is how to deal with a non-cooperative game involving multiple players. To formulate a mathematical framework for such an environment, three basic realities should be accounted for:

(i) a state space that is the product of the individual players' states;

(ii) state transitions that are functions of joint actions taken by the players; and (iii) payoffs to individual players that depend on joint actions as well.

That framework is found in stochastic games, which also occasionally appear under the name "Markov games" in computer science literature.

A stochastic game is described by the five-tuple $\{N,S,\vec{A},P,\vec{R}\}$, where N is a set of players, indexed 1, 2, ..., n;

S is a set of possible states;

$\vec{A}$ is a joint-action space defined by the product set $A_1 \times A_2 \times \ldots \times A_n$, where $A_j$ is the set of actions available to the jth player;

P is a probabilistic transition function, an element of which for joint action a satisfies the condition $$\sum_{s' \in S} p^a_{ss'} = 1$$

for all s'∈S and a∈$\vec{A}$; and $\vec{R} = r_1 \times r_2 \times \ldots \times r_n$, where $r_j$ is the payoff for the jth player and which is a function of the joint actions of all n players.

One other notational issue: the action of player j∈N is denoted by $a_j$, while the joint actions of the other n−1 players in the set N are denoted by $a_{-j}$. Similar notation is used herein for some other variables.

Figure 2:
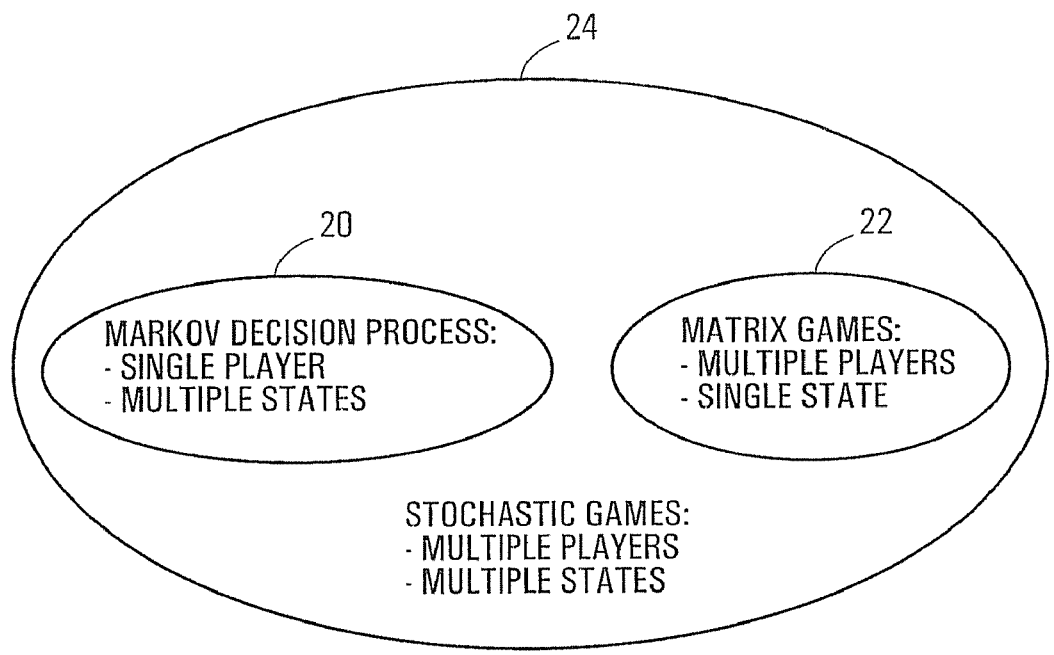
FIG. 2 is a block diagram illustrating differences between Markov decision processes, matrix games, and stochastic games.

Stochastic games are supersets of two kinds of decision processes, namely Markov decision process and matrix games, as illustrated in FIG. 2. A Markov decision process as shown at 20 is a special case of a stochastic game 24 with a single player, that is, n=1. On the other hand, a matrix game as shown at 22 is a special case of a stochastic game 24 with a single state, that is, |S|=1.

With two or more players, often referred to as agents in machine learning literature, being an integral part of a game, it is natural for the study of cognitive radio to be motivated by certain ideas in game theory. Prominent among those ideas for finite games (i.e., stochastic games for which each player has only a finite number of alternative courses of action) is that of a Nash equilibrium, so named for the Nobel Laureate John Nash.

A Nash equilibrium is defined as an action profile (i.e., a vector of players' actions) in which each action is a best response to the actions of all the other players. According to this definition, a Nash equilibrium is a stable operating or equilibrium point in the sense that there is no incentive for any player involved in a finite game to change strategy given that all the other players continue to follow the equilibrium policy. The important point to note here is that the Nash-equilibrium approach provides a powerful tool for modeling nonstationary processes. Simply put, it has had an enormous influence on the evolution of game theory by shifting its emphasis toward the study of equilibria as a predictive concept.

With the learning process modeled as a repeated stochastic game (i.e., repeated version of a one-shot game), each player gets to know the past behavior of the other players, which may influence the current decision to be made. In such a game, the task of a player is to select the best mixed strategy, given information on the mixed strategies of all other players in the game. Hereafter, other players are referred to primarily as "opponents". A mixed strategy is defined as a continuous randomization by a player of its own actions, in which the actions (i.e., pure strategies) are selected in a deterministic manner. Stated in another way, the mixed strategy of a player is a random variable whose values are the pure strategies of that player.

To explain what we mean by a mixed strategy, let $a_{j,k}$ denote the kth action of player j with k=1, 2, . . . , K. The mixed strategy of player j, denoted by the set of probabilities $\{p_{j,k}\}_{k=1}^{K}$ is an integral part of the linear combination $$q_j = \sum_{k=1}^{K} p_{j,k} a_{j,k} \text{ for } j = 1, 2, \ldots, n. \quad (1)$$

Equivalently, we may express $q_j$ as the inner product $$q_j = p_j^T a_j \text{ for } j=1,2,\ldots,n \quad (2)$$

where
$p_j = [p_{j,1}, p_{j,2}, \ldots, p_{j,K}]^T$ is the mixed strategy vector;
$a_j = [a_{j,1}, a_{j,2}, \ldots, a_{j,K}]^T$ is the deterministic action vector; and
the superscript T denotes matrix transposition.
For all j, the elements of the mixed strategy vector $p_j$ satisfy two conditions:

$$0 \leq p_{j,k} \leq 1 \quad (3)$$

and $$\sum_{k=1}^{K} p_{j,k} = 1. \quad (4)$$

Note also that the mixed strategies for the different players are statistically independent.

The motivation for permitting the use of mixed strategies is the well-known fact that every stochastic game has at least one Nash equilibrium in the space of mixed strategies but not necessarily in the space of pure strategies, hence the preferred use of mixed strategies over pure strategies. The purpose of a learning algorithm is that of computing a mixed strategy, namely a sequence $\{q^{(1)}, q^{(2)}, \ldots, q^{(t)}\}$ over time t.

It is also noteworthy that the implication of (1) through (4) is that the entire set of mixed strategies lies inside a convex simplex or convex hull, whose dimension is K−1 and whose K vertices are the $a_{j,k}$. Such a geometric configuration makes the selection of the best mixed strategy in a multiple-player environment a more difficult proposition to tackle than the selection of the best base action in a single-player environment.

The formulation of Nash equilibrium assumes that the players are rational, which means that each player has a "view of the world". Mutual knowledge of rationality and common knowledge of beliefs may be sufficient for deductive justification of the Nash equilibrium. Belief refers to state of the world, expressed as a set of probability distributions over tests, "tests" meaning a sequence of actions and observations that are executed at a specific time.

Despite the insightful value of the above proposed justification, the notion of the Nash equilibrium has two practical limitations:

(i) The approach advocates the use of a best-response strategy (i.e., a strategy whose outcome against an opponent with a similar goal is the best possible one). But in a two-player game for example, if one player adopts a non-equilibrium strategy, then the optimal response of the other player is also of a non-equilibrium kind. In such situations, the Nash-equilibrium approach is no longer applicable.

(ii) Description of a non-cooperative game is essentially confined to an equilibrium condition. Unfortunately, the approach does not teach about the underlying dynamics involved in establishing that equilibrium.

To refine the Nash equilibrium theory, we may embed learning models in the formulation of game-theoretic algorithms. This new approach provides a foundation for equilibrium theory, in which less than fully rational players strive for some form of optimality over time.

Statistical learning theory is a well-developed discipline for dealing with uncertainty, which makes it well-suited for solving game-theoretic problems. In this context, a class of no-regret algorithms is attracting a great deal of attention in the machine-learning literature.

The provision of "no-regret" is motivated by the desire to ensure two practical end-results:

(i) A player does not get unlucky in an arbitrary nonstationary environment. Even if the environment is not adversarial, the player could experience bad performance when using an algorithm that assumes independent and identically distributed (i.i.d.) examples. The no-regret provision guarantees that such a situation does not arise.

(ii) Clever opponents of that player do not exploit dynamic changes or limited resources for their own selfish benefits.

The notion of regret can be defined in different ways. In a unified treatment of game-theoretic learning algorithms, Greenwald (A. Greenwald, "Game-Theoretic Learning", Tutorial Notes presented at the International Conference on Machine Learning, Banff, Alberta, July 2004) identifies three regret variations, including external regret, internal regret, and swap regret. One particular definition of no regret is basically a rephrasing of boosting, which coincides with external regret as proposed by Greenwald. The original formulation of boosting is due to Freund and Schapire in Y. Freund and R. E. Schapire, "A decision-theoretic generalization of on-line learning and an application to boosting", Journal of Computer and System Sciences, volume 55, pp. 119-139, 1997. Basically, boosting refers to the training of a committee machine in which several experts are trained on data sets with entirely different distributions. It is a general method that can be used to improve the performance of any learning model. Stated in another way, boosting provides a method for modifying the underlying distribution of examples in such a way that a strong learning model is built around a set of weak learning modules.

To see how boosting can also be viewed as a no-regret proposition, consider a prediction problem with $\vec{x}_1, \vec{x}_2, \ldots, \vec{x}_{t-1}$ denoting a sequence of input vectors. Let $\vec{x}_t$ denote the one-step prediction at time t computed by the boosting algorithm operating on this sequence. The prediction error is defined by the difference $\vec{e}_t = \vec{x}_t - \hat{\vec{x}}_{t-1}$. Let $l(\vec{e}_t)$ denote a convex cost function of the prediction error $\vec{e}_t$. The mean-square error is an example of such a cost function. After processing N examples, the resulting cost function of the boosting algorithm is given by $$L_N = \sum_{t=1}^{N} l(e_t). \quad (5)$$

If, however, the prediction were to be performed by one of the experts using some fixed hypothesis h to yield the prediction error $\vec{e}_t(h)$, then the corresponding cost function would have the value $$L_N(h) = \sum_{t=1}^{N} l(e_t(h)). \quad (6)$$

The regret for not having used hypothesis h is the difference $$\rho_N(h) = L_N - L_N(h) \quad (7)$$
$$= \sum_{t=1}^{N} l(e_t) - l(e_t(h)).$$

We say that the regret is negative if the difference $\rho_N(h)$ is negative. Let H denote the class of all hypotheses used in the algorithm. Then the overall regret for not having used the best hypothesis h∈H is given by the supremum $$\rho_N = \sup_{h \in H} \rho_N(h). \quad (8)$$

A boosting algorithm is synonymous with no-regret algorithms because the overall regret $\rho_N$ is small no matter which particular sequence of input vectors is presented to the algorithm.

Unfortunately, most no-regret algorithms are designed on the premise that the hypotheses are chosen from a small, discrete set which, in turn, limits applicability of the algorithms. To overcome this limitation, the Freund-Schapire boosting (Hedge) algorithm may be expanded by considering a class of prediction problems with internal structure. Specifically, the internal structure presumes two things:

(i) The input sectors are assumed to lie on or inside an almost arbitrary convex set, so long as it is possible to perform convex optimization. For example, we could have a d-dimensional polyhedron or d-dimensional sphere, where d is dimensionality of the input space.

(ii) The prediction rules (i.e., experts) are purposely designed to be linear.

An example scenario that has the internal structure embodied under points (i) and (ii) is that of planning in a stochastic game described by a Markov decision process, in which state-action costs are controlled by an adversarial or clever opponent after the player in question fixes its own policy. The reader is referred to H. B. McMahan, G. J. Gordon, and A. Blum, "Planning in the Presence of Cost Functions Controlled by an Adversary", in Proceedings of the Twentieth International Conference on Machine Learning, Washington, D.C., 2003, for such an example involving a robot path-planning problem, which may be likened to a cognitive radio problem made difficult by the actions of a clever opponent.

Given such a framework, we can always make a legal prediction in an efficient manner via convex duality, which is an inherent property of convex optimization. In particular, it is always possible to choose a legal hypothesis that prevents the total regret from growing too quickly, and therefore causes the average regret to approach zero.

By exploiting this internal structure, a new learning rule referred to as the Lagrangian, hedging algorithm may be derived. This new algorithm is of a gradient descent kind, which includes two steps, namely, projection and scaling. The projection step simply ensures that we always make a legal prediction. The scaling step adaptively adjusts the degree to which the algorithm operates in an aggressive or conservative manner. In particular, if the algorithm predicts poorly, then the cost function assumes a large value on the average, which in turn tends to make the predictions change slowly.

The algorithms derives its name from a combination of two points:

(i) The algorithm depends on one free parameter, namely, a convex hedging function.

(ii) The hypothesis of interest can be viewed as a Lagrange multiplier that keeps the regret from growing too fast.

To expand on the Lagrangian issue under point (ii), consider the case of a matrix game using a regret-matching algorithm. Regret-matching, embodied in the so-called generalized Blackwell condition, means that the probability distribution over actions by a player is proportional to the positive elements in the regret vector of that player. For example, in the so-called "rock-scissors-paper" game in which rock smashes scissors, scissors cut paper, and paper wraps the rock, if we currently have a vector made up as follows:

regret 2 versus rock,
regret −7 versus scissors, and
regret 1 versus paper, then we would play rock ⅔ of the time, never play scissors, and play paper ⅓ of the time. The prediction at each step of the regret-matching algorithm is a probability distribution over actions. Ideally, we desire the no-regret property, which means that the average regret vector approaches the region where all of its elements are less than or equal to zero.

However, at any finite time, in practice, the regret vector may still have positive elements. In such a situation, we cannot achieve the no-regret condition exactly in finite time. Rather, we apply a soft constraint by imposing a quadratic penalty function on each positive element of the regret vector. The penalty function involves the sum of two components, one being the hedging function and the other being an indicator function for the set of unnormalized hypotheses using a gradient vector. The gradient vector is itself defined as the derivative of the penalty function with respect to the regret vector, the evaluation being made at the current regret vector. It turns out that the gradient vector is just the regret vector with all negative elements set equal to zero. The desired hypotheses is obtained by normalizing this vector to form a probability distribution of actions, which yields exactly the regret-matching algorithm. In choosing the distribution of actions in the manner described herein, we enforce the constraint that the regret vector is not allowed to move upwards along the gradient. The quadratic penalty function cannot grow too Quickly, which in turn means that our average gradient vector will get closer to the negative orthant, as desired.

In short, the Lagrangian hedging algorithm is a no-regret algorithm designed to handle internal structure in the set of allowable predictions. By exploiting this internal structure, tight bounds on performance and fast rates of convergence are achieved when the provision of no regret is of utmost importance.

As an alternative to game-theoretic learning exemplified by a no-regret algorithm, we may look to another approach which is rooted in information theory, namely water-filling. To be specific, consider a cognitive radio environment involving n transmitters and n receivers. The environmental model is based on two assumptions:

(i) Communication across a channel is asynchronous, in which case the communication process can be viewed as a non-cooperative game. For example, in a mesh network consisting of a mixture of ad-hoc networks and existing infrastructured networks, the communication process from a base station to users is controlled in a synchronous manner, but the multi-hop communication, process across the ad-hoc network could be asynchronous and therefore non-cooperative.

(ii) A signal-to-noise ratio (SNR) gap is included in calculating the transmission rate so as to account for the gap between the performance of a practical coding-modulation scheme and the theoretical value of channel capacity. In effect, the SNR gap is large enough to assure reliable communication under operating conditions all the time.

In mathematical terms, the essence of transmit power control for such a noncooperative multi-user radio environment may be stated as follows:

Given a limited number of spectrum holes, select the transmit power levels of n unserviced users so as to jointly maximize their data-transmission rates, subject to the constraint that an interference or interference-temperature limit is not violated.

Spectrum holes, which provide an opportunity for an unserviced user to transfer communication signals, and interference temperature as a measure of interference, are described in detail in the above-referenced International (PCT) Patent Application Serial No. PCT/CA2005/001562, and U.S. Provisional Patent Application Ser. No. 60/617,638.

It may be tempting to suggest that the solution of this problem lies in simply increasing the transmit power level of each unserviced transmitter. However, increasing the transmit power level of any one transmitter has the undesirable effect of also increasing the level of interference to which the receivers of all the other transmitters are subjected. The conclusion to be drawn from this reality is that it is not possible to represent the overall system performance with a single index of performance. Rather, a tradeoff among the data rates of all unserviced users in some computationally tractable fashion should be considered.

Ideally, we would like to find a global solution to the constrained maximization of the joint set of data-transmission rates under study. Unfortunately, finding this global solution requires an exhaustive search through the space of all possible power allocations, in which case we find that the computational complexity needed for attaining the global solution assumes a prohibitively high level.

To overcome this computational difficulty, we use a new optimization criterion called competitive optimality, which is discussed in Chapter 4 of the doctoral dissertation of W. Yu, "Competition and Cooperation in Multi-user Communication Environments", Doctoral Dissertation, Stanford University, 2002. In particular, Yu develops an iterative water-filling algorithm for a sub-optimum solution to the multi-user digital subscriber line (DSL) environment, viewed as a noncooperative game.

The transmit power control problem, may now be restated as follows:

Considering a multi-user cognitive radio environment viewed as a noncooperative game, maximize the performance of each unserviced transceiver, regardless of what all the other transceivers do, but subject to the constraint that an interference limit not be violated.

This formulation of the distributed transmit power control problem leads to a solution that is of a local nature. Although sub-optimum, the solution is insightful, as described in further detail below.

Figure 3:
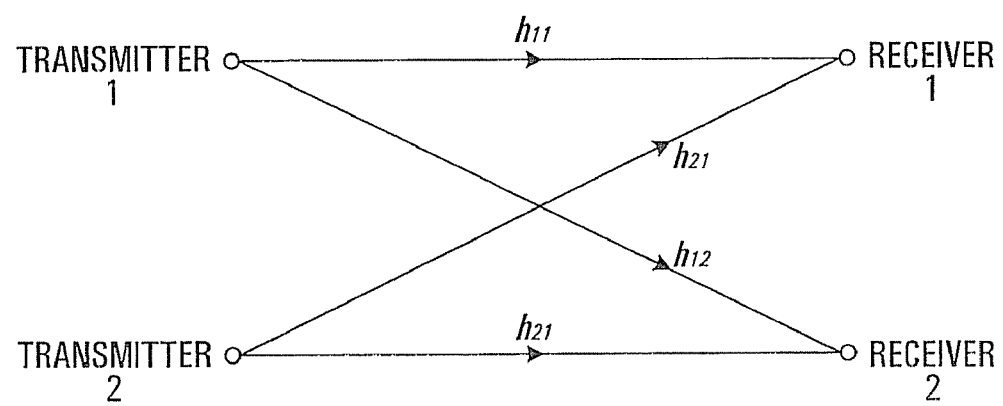
FIG. 3 is a signal flow graph of a two-user communication scenario.

Consider the simple scenario of FIG. 3, involving two users communicating across a flat-fading channel. The complex-valued baseband channel matrix is denoted by $$H = \begin{bmatrix} h_{11} & h_{12} \\ h_{21} & h_{22} \end{bmatrix}. \tag{9}$$

Viewing this scenario as a non-cooperative game, we may describe the two players of the game as follows:

The two players are represented by transmitters 1 and 2. In the two-user example of FIG. 3, each user is represented by a single-input, single-output (SISO) wireless system, hence the adoption of transmitters 1 and 2 of the two systems as the two players in a game-theoretic interpretation of the example. In a MIMO generalization of this example, each user has multiple transmitters. Nevertheless, there are still two players, with the two players being represented by the two sets of one or more transmitters.

The pure strategies (i.e., deterministic actions) of the two players are defined by the power spectral densities $S_1(f)$ and $S_2(f)$ that respectively pertain to the transmitted signals radiated by antennas of transmitters 1 and 2.

The payoffs to the two players are defined by the data transmission rates $R_1$ and $R_2$, which are respectively produced by transmitters 1 and 2.

The noise floor of the radio frequency (RF) environment is characterized by a frequency-dependent parameter, the power spectral density $S_N(f)$. In effect, $S_N(f)$ defines the "noise floor" above which the transmit power controller must fit the transmission data requirements of users 1 and 2.

The cross-coupling between the two users in terms of two new real-valued parameters $\alpha_1$ and $\alpha_2$ may be defined by writing $$\alpha_1 = \frac{\Gamma|h_{12}|^2}{|h_{22}|^2} \quad (10)$$

and $$\alpha_2 = \frac{\Gamma|h_{21}|^2}{|h_{11}|^2} \quad (11)$$

where $\Gamma$ is the signal-to-noise ratio (SNR) gap. Assuming that the receivers do not perform any form of interference cancellation irrespective of the received signal strengths, we may respectively formulate the achievable data-transmission rates $R_1$ and $R_2$ as the two definite integrals $$R_1 = \int_{hole\,1} \log_2\left(1 + \frac{S_1(f)}{N_1(f) + \alpha_2 S_2(f)}\right) df \quad (12)$$

and $$R_2 = \int_{hole\,2} \log_2\left(1 + \frac{S_2(f)}{N_2(f) + \alpha_1 S_1(f)}\right) df. \quad (13)$$

The term $\alpha_2 S_2(f)$ in the first denominator and the term $\alpha_1 S_1(f)$ in the second denominator are due to the cross-coupling between the transmitters and receivers. The remaining two terms $N_1(f)$ and $N_2(f)$ are noise terms defined by $$N_1(f) = \frac{\Gamma S_{N,1}(f)}{|h_{11}|^2} \quad (14)$$

and $$N_2(f) = \frac{\Gamma S_{N,2}(f)}{|h_{22}|^2} \quad (15)$$

where $S_{N,1}(f)$ and $S_{N,2}(f)$ are respectively the particular parts of the noise-floor's spectral density $S_N(f)$ that define the spectral contents of spectrum holes 1 and 2.

We are now ready to formally state the competitive optimization problem as follows:

Given that the power spectra density $S_2(f)$ of a transmitter 2 is fixed, maximize the data transmission rate $R_1$ of transmitter 1, subject to the constraint $$\int_{hole\,1}[S_1(f)+N_1(f)+\alpha_2 S_S(f)]df \leq kT_{max}$$

where $T_{max}$ is a prescribed interference temperature limit and k is Boltzmann's constant. A similar statement applies to the competitive optimization of transmitter 2.

Of course, it is understood that both $S_1(f)$ and $S_2(f)$ remain nonnegative for all f. The solution to the optimization problem described herein follows the allocation of transmit power in accordance with a water-filling procedure.

Figure 4:
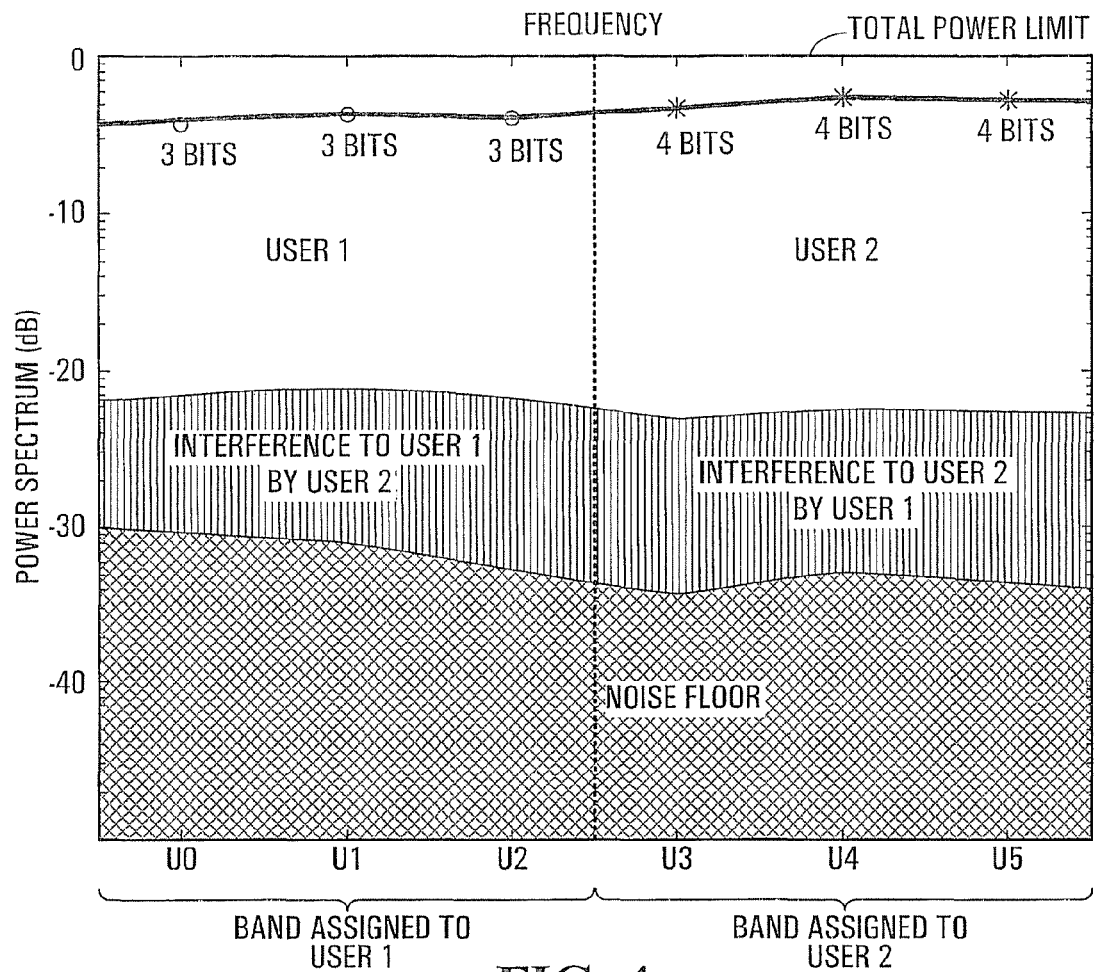
FIG. 4 is a plot of results of an illustrative experiment on a two-user wireless communication scenario.

FIG. 4 is a plot of results of an illustrative experiment on a two-user wireless communication scenario, which were obtained using the water-filling procedure. The results presented in FIG. 4 were generated under the following conditions, although of course it should be appreciated that these results are intended solely for illustrative purposes and that similar or different results may be exhibited under different test or actual conditions:

Narrowband channels uniformly spaced in frequency are available to the 2 users, as follows—user 1, channels 1, 2, and 3; user 2, channels 4, 5, and 6.

Modulation strategy is OFDM.

Multi-user path-loss matrix $$\begin{bmatrix} 0.5207 & 0 & 0 & 0.0035 & 0.0020 & 0.0024 \\ 0 & 0.5223 & 0 & 0.0030 & 0.0034 & 0.0031 \\ 0 & 0 & 0.5364 & 0.0040 & 0.0015 & 0.0035 \\ \hline 0.0036 & 0.0002 & 0.0023 & 0.7136 & 0 & 0 \\ 0.0028 & 0.0029 & 0.0011 & 0 & 0.6945 & 0 \\ 0.0022 & 0.0010 & 0.0034 & 0 & 0 & 0.7312 \end{bmatrix}.$$

Target data transmission rates for users 1 and 2 are 9 and 12 bits/symbol, respectively.

Power constraint imposed by interference-temperature limit was 0 dB.

Receiver noise-power level=−30 dB.

Ambient interference power level=−24 dB.

The solution presented in FIG. 4 was reached in 2 iterations of the water-filling algorithm. Two things are illustrated in FIG. 4:

(i) the spectrum-sharing process performed using an iterative water-filling algorithm; and (ii) the bit-loading curve at the top of the Figure.

To add meaning to the important result portrayed in FIG. 4, we may state that the optimal competitive response to the all pure-strategy corresponds to a Nash equilibrium. Stated in another way, a Nash equilibrium is reached if, and only if, both users simultaneously satisfy the water-filling condition.

An assumption implicit in the water-filling solution presented in FIG. 4 is that each transmitter of cognitive radio has knowledge of its position with respect to the receivers in its operating range at all times. In other words, cognitive radio has geographic awareness, which may be implemented by embedding a global positioning satellite (GPS) receiver in the system design, for instance.

A transmitter puts its geographic awareness to good use by calculating the path loss incurred in the course of electromagnetic propagation of the transmitted signal to each receiver in the transmitter's operating range, which in turn makes it possible to calculate the multi-user path-loss matrix of the environment. Let d denote the distance from a transmitter to a receiver. Extensive measurements of the electromagnetic field strength, expressed as a function of the distance d, carried out in various radio environments have motivated an empirical propagation formula for the path loss, which expresses the received signal power $P_R$ in terms of the transmitted signal power $P_T$ as $$P_R = \left(\frac{\beta}{d^m}\right) P_T,$$

where the path-loss exponent m varies from 2 to 5, depending on the environment, and the attenuation parameter $\beta$ is frequency-dependent.

Considering the general case of n transmitters indexed by i, and n receivers indexed by j, let $h_{ij}$ denote the complex-valued channel coefficient from transmitter i to receiver j. Then, in light of the empirical propagation formula, we may write $$|h_{ij}|^2 = \frac{P_{R,j}}{P_{T,i}} = \frac{\beta}{d_{ij}^m}$$

for i=1, 2, ..., n and j=1, 2, ..., n, and with $d_{ij}$ being the distance from transmitter i to receiver j. Hence, knowing β, m, and $d_{ij}$ for all i and j, we may calculate the multi-user path-loss matrix.

Emboldened by the water-filling solution illustrated in FIG. 4 for a two-user scenario, we may formulate an iterative two-loop water-filling algorithm for the distributed transmit power control of a multi-user radio environment. The environment involves a set of transmitters indexed by i=1, 2, ..., n and a corresponding set of receivers indexed by j=1, 2, ..., n. Viewing the multi-user radio environment as a non cooperative game and assuming the availability of an adequate number of spectrum holes to accommodate target data transmission rates, an iterative water-filling algorithm may proceed as follows:

(i) Initialization. Unless some prior knowledge is available, the power distribution across the n users is set equal to zero or some other initial value.

(ii) Inner loop (iteration). Given a set of allowed channels (i.e., spectrum holes):

User 1 performs water-filling, subject to its power constraint. At first, the user employs one channel, but if its target rate is not satisfied, it may attempt to employ two channels, and so on. The water-filling by user 1 is performed with only the noise floor to account for.

User 2 performs the water-filling process, subject to its own power constraint. At this point, in addition to the noise floor, the water-filling computation for user 2 may account for interference produced by user 1.

The power-constrained water-filling process is continued until all n users are dealt with.

(iii) Outer loop (iteration). After the inner iteration is completed, the power allocation among the n users is adjusted:

If the actual data transmission rate of any user is found to be greater than its target value, the transmit power of that user is reduced.

If, on the other hand, the actual data transmission rate of any user is less than the target value, the transmit power is increased, keeping in mind that an interference limit, illustratively an interference temperature limit, is not violated.

(iv) Confirmation. After the power adjustments, up or down, are completed, the data transmission rates of all the n users are checked:

If the target rates of all the n users are satisfied, the computation is terminated.

Otherwise, the algorithm goes back to the inner loop, and the computations are repeated. This time, however, the water-filling performed by every user, including user 1, preferably accounts for the interference produced by all the other users.

In effect, the outer loop of the distributed transmit power controller tries to find the minimum level of transmit power needed to satisfy the target data transmission rates of all n users.

For the distributed transmit power controller to function properly, two requirements are preferably satisfied:

Each user knows, a priori, its own target rate.

All target rates lie within a permissible rate region. Otherwise, some or all of the users will violate the interference limit.

To distributively lie within the permissible rate region, the transmitter is preferably equipped with a centralized agent that has knowledge of the channel capacity (through rate-feedback from the receiver, for instance) and multi-user path-loss matrix (by virtue of geographic awareness). The centralized agent is thereby enabled to decide which particular sets of target rates are indeed attainable.

The iterative water-filling (WF) approach, rooted in communication theory, has a "top-down, dictatorially-controlled" flavor. In contrast, a no-regret algorithm, rooted in machine learning, has a "bottom-up" flavor. In more specific terms, we may make the following observations:

(i) The iterative WF algorithm exhibits fast-convergence behavior by virtue of incorporating information on both the channel and RF environment. On the other hand, a no-regret algorithm exemplified by the Lagrangian hedging algorithm relies on first-order gradient information, causing it to converge comparatively slowly.

(ii) The Lagrangian hedging learner has the attractive feature of incorporating a regret agenda, the purpose of which is to guarantee that the learner cannot be deceptively exploited by a clever player. On the other hand, the iterative WF algorithm lacks a learning strategy that could enable it to guard against exploitation.

In short, the iterative water-filling approach has much to offer for dealing with multi-laser scenarios, but its performance could be improved through interfacing with a more competitive, regret-conscious learning-machine that enables it to mitigate the exploitation phenomenon.

Figure 5:
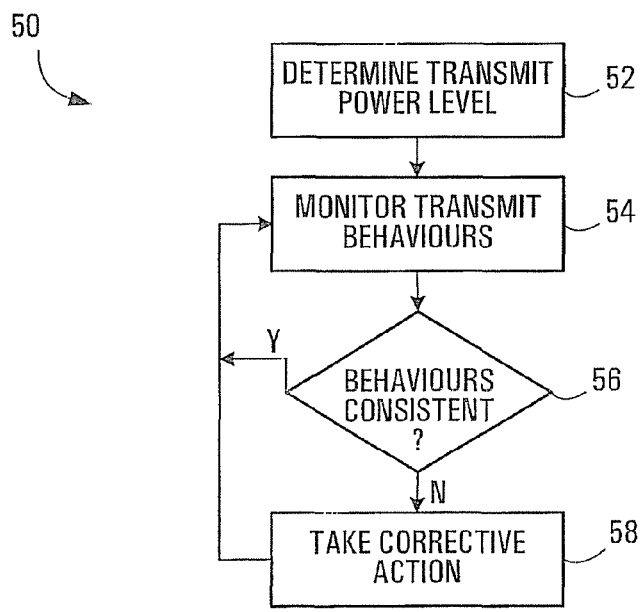
FIG. 5 is a flow diagram of a transmit power control method according to an embodiment of the invention.

Transmit power control techniques have been described in substantial detail above. FIG. 5 is a flow diagram of a method according to an embodiment of the invention, in which power control techniques rooted in vastly different technical fields are combined into one method of controlling transmit power in a multi-user wireless communication system.

As shown, the method 50 begins at 52 with an operation of determining a transmit power level for a transmitter. This determination is made according to a communication theory algorithm, one example of which is an iterative water-filling procedure. The communication theory algorithm used at 52 is based on an assumption of transmit behaviours of transmitters in the communication system.

At 54, the method 50 continues with an operation of monitoring transmit behaviours of the transmitters in the communication system. Whereas the determining operation at 52 uses a communication theory algorithm, the monitoring operation at 54 uses a learning algorithm.

In one embodiment, the communication theory algorithm is an iterative water-filling procedure which accounts for determined transmit power levels of the transmitter and other transmitters in the communication system.

An example of such an iterative procedure has been described above, and may begin with initializing a transmit power distribution across n transmitters. Water-filling is then performed for the transmitter to determine a transmit power level for a target data transmission rate of the transmitter subject to a power constraint for the transmitter and a level of interference, the level of interference comprising a noise floor plus either initialized transmit power levels or previously determined transmit power levels for the other transmitters. A determination is then made as to whether a data transmission rate of the transmitter is greater than or less than a target data transmission rate of the transmitter, and if so, the determined transmit power level for the transmitter is adjusted. A similar determination is then made for other transmitters, to determine whether a target data transmission rate of at least one of the n transmitters is not satisfied by a respective adjusted transmit power level for the at least one transmitter. The water-filling is repeated where the target data transmission rate of at least one of the n transmitters is not satisfied.

The operations of performing, determining whether a data transmission rate of a transmitter is greater than or less than a target transmission rate, and adjusting may be repeated for each of the other transmitters.

The operation of determining whether the target data transmission rate of at least one of the n transmitters is not satisfied may involve determining whether the target data transmission rates of all of the n transmitters are not satisfied. In this case, the water-filling is repeated where the target data transmission rates of all of the n transmitters are not satisfied. A target data transmission rate may be considered not satisfied if an actual or attainable data transmission rate differs from the target data transmission rate by a predetermined amount.

Adjusting a transmit power level may involve reducing the determined transmit power level for a transmitter where the data transmission rate of the transmitter is greater than the target data transmission rate of the transmitter. Where the data transmission rate of the transmitter is less than the target data transmission rate of the transmitter, adjusting may involve determining whether increasing the determined transmit power level of the transmitter would violate an interference level limit, and if not, increasing the determined transmit power level of the transmitter.

The method 50 continues at 56 with an operation of determining whether the behaviours of the transmitters are consistent with the assumption of behaviours on which the transmit power level determination algorithm is based. Any "misbehaving" transmitters can impact the effectiveness of the transmit power level determination algorithm, and thus the operation of other transmitters in the communication system. Since the transmitters are competing for the same limited resource, a particular transmitter should not be allowed to exploit the resource for only its own benefit if this also negatively affects other transmitters.

One possible action which may be taken when the transmit behaviour of a transmitter is not consistent with the behaviour assumption of the transmit power level determination algorithm would be to generate an alert. Such an alert could be raised locally, at a communication device where the method 50 is being performed, and/or sent to a remote device or system.

Corrective action may also be taken, as shown at 58. This may include actions affecting the transmit power level determination algorithm at 52 and/or actions taken by a communication network operator or service provider. A possible network operator or service provider corrective action might be to increase communication service charges for a user of a transmitter which does not abide by the transmit behaviour assumption(s) upon which the transmit power level determination algorithm is based.

As noted above, transmit power level determination in some embodiments involves detecting at least one spectrum hole and determining a transmit power level for the transmitter for transmission within the at least one spectrum hole.

It should be appreciated that the method 50 is intended solely for the purposes of illustration. Embodiments of the invention may involve further, fewer, or different operations which may be performed in a similar or different order than explicitly shown.

For example, in some embodiments, a transmit power control method also includes an operation of predicting subsequent availability of a detected spectrum hole, and the operations of determining and monitoring at 52, 54 are repeated when the at least one spectrum hole is predicted to become unavailable.

Also in the context of spectrum holes, one or more further spectrum holes may be detected. The operations of determining and monitoring may then be repeated to control transmit power levels for transmitters within the further spectrum hole(s), such as when an increase in interference in a current spectrum hole is detected.

Transmit power control may also involve determining a position of the transmitter relative to other transmitters in the communication system. A multi-user path loss matrix of the operating environment of the transmitter may then be calculated based on the determined position of the transmitter relative to the other transmitters.

Figure 6:
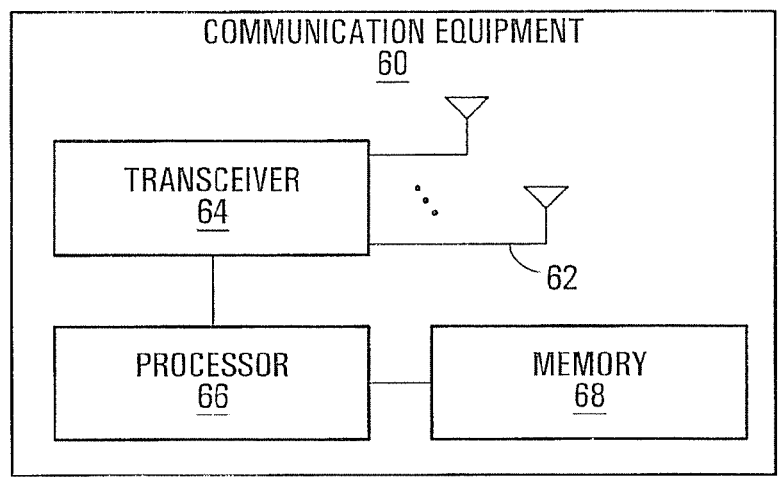
FIG. 6 is a block diagram of communication equipment in which embodiments of the invention may be implemented.

In terms of a system for controlling transmit power in a multi-user wireless communication system, FIG. 6 is a block diagram of communication equipment in which embodiments of the invention may be implemented. The communication equipment 60 includes a transceiver 64 and one or more antennas 62 for receiving communication signals (including stimuli from interferers) from and transmitting communication signals to other communication equipment. Multiple antennas 62 are provided, for example, in Multiple-Input Multiple-Output (MIMO) communication equipment. The communication equipment 60 also includes a, processor 66 connected to the transceiver 64 and a memory 68.

Many different types of transceiver 64 and antennas 62 will be apparent to those skilled in the art. The particular types of the transceiver 64 and to some extent the antennas 62 are dependent upon, for example, the type of the communication equipment 60 and/or the communication system in which it is intended to operate. The invention is in no way limited to any particular type of transceiver 64 or antennas 62. Embodiments of the invention may be implemented, for example, in mobile communication devices, base stations, and/or other equipment in a wireless communication system.

The processor 66 may include or be implemented as a microprocessor or a digital signal processor, for example, which is configurable to perform any or all of the functions disclosed herein by executing software stored in the memory 68. Other functions may also be performed by the processor 66, such that the processor 66 is not necessarily a dedicated processor. The specific implementation of the processor 66 and the memory 68, or other functional elements used in further embodiments of the invention, may also be dependent to some extent on the type of the communication equipment 60 and/or the communication system in which it is intended to operate.

In a mobile communication device, for example, the memory 68 would typically include a solid state memory device, although other types of memory device may also or instead be provided in the communication equipment 60.

In operation, the processor 66 is configured, by software stored in the memory 68, to determine a transmit power level for a transmitter in the transceiver 64 according to an algorithm based in communication theory, illustratively an iterative water-filling procedure, and to monitor transmit behaviours of other transmitters using a learning algorithm.

Information associated with transmit behaviours of the other transmitters may be received by the processor 66 through a receiver in the transceiver 64 and the antenna(s) 62. More generally, the processor 66 has an input which receives transmit behaviour information associated with other transmitters in a communication system.

The processor 66 may perform these operations substantially as described above. Other operations may also be performed. For example, the processor 66 may participate directly or indirectly in corrective actions that affect "misbehaving" transmitters. Indirect participation may involve detecting transmit behaviours that are not consistent with assumed conditions under which a transmit power control algorithm operates most effectively and alerting another device or system to this detection. Direct participation would involve a corrective action being performed by the processor 66 itself.

Communication equipment may also or instead include a GPS receiver, which would allow the processor 66 to determine a position of its transmitter based on signals received by the GPS receiver.

It should be appreciated that the present invention is in no way limited to the particular operations or system components explicitly shown in FIGS. 5 and 6. Embodiments of the invention may include further or fewer operations or components which are performed or connected differently than shown in the drawings. For example, the techniques disclosed herein may be applied to communication equipment in which only a receiver, a transmitter, or a single antenna or sensor are provided. The various functions disclosed herein may also be implemented using separate hardware, software, and/or firmware components, and need not be performed by a single module such as the processor shown in FIG. 6. Other implementations of embodiments of the invention, as instructions stored on a machine-readable medium, for example, are also contemplated.

It should also be appreciated that use of the term "user" herein is not intended to imply that the present invention is restricted to use in conjunction with only end user communication equipment. The techniques disclosed herein could be employed at end user handsets, communication system base stations or other network equipment, or both.

In addition, those skilled in the art will note that the term "user" has in some cases been used to refer to communication equipment of a user as opposed to an actual user of that equipment, in the context of a multi-user communication system or determining transmit power levels for users.

References to "users" should be interpreted accordingly.

Dynamic spectrum management, also commonly referred to as dynamic frequency allocation, is a process which could be performed in a transmitter. Transmit power control as described in detail above is also performed in a transmitter. These two tasks are so intimately related to each other that both may be included in a single functional module which performs the role of multiple-access control in the basic cognitive cycle of FIG. 1.

Simply put, one primary purpose of spectrum management is to develop an adaptive strategy for the efficient and effective utilization of the RF spectrum. Specifically, a spectrum management algorithm may build on spectrum holes detected during radio-scene analysis, as described in the co-pending application incorporate above, and the output of a transmit power controller to select communication parameters such as a modulation strategy that adapt to the time-varying conditions of the radio environment, all the time assuring reliable communication across the channel. Communication reliability may be assured, for example, by choosing the SNR gap $\Gamma$ large enough a priori, as discussed above.

A modulation strategy that lends itself to cognitive radio is OFDM, by virtue of its flexibility and computational efficiency. For its operation, OFDM uses a set of carrier frequencies centered on a corresponding set of narrow channel bandwidths. The availability of rate feedback (through the use of a feedback channel) permits the use of bit-loading, whereby the number of bits/symbol for each channel is optimized for the signal-to-noise ratio characterizing that channel. This operation is illustrated by the uppermost curve in FIG. 4.

Figure 7:
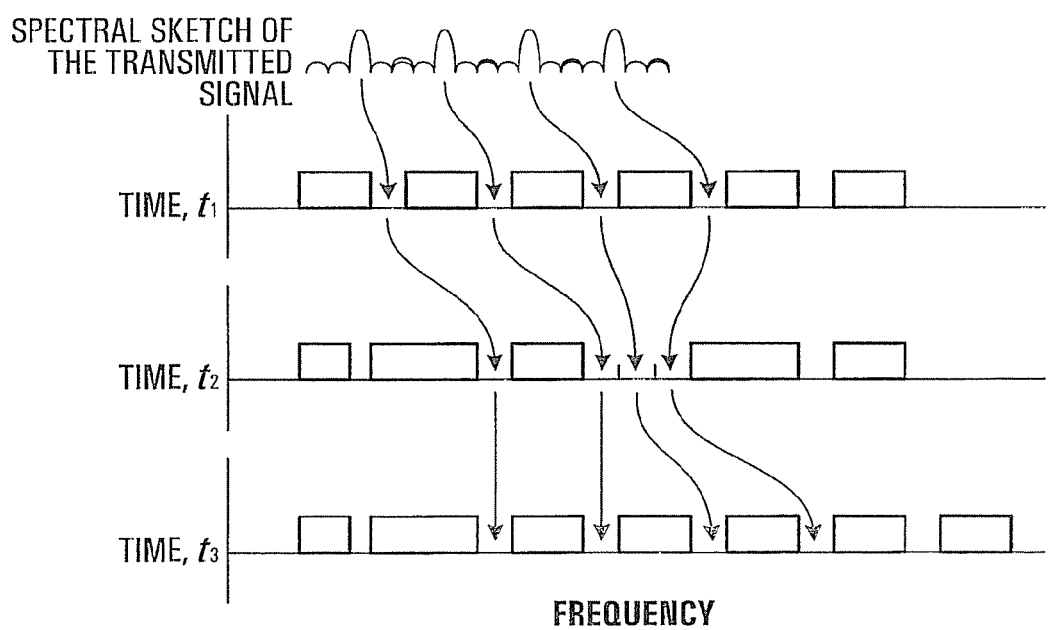
FIG. 7 is a time-frequency plot illustrating dynamic spectrum sharing for OFDM.

As time evolves and spectrum holes come and go, the bandwidth-carrier frequency implementation of OFDM is dynamically modified, as illustrated in the time-frequency plot pictured in FIG. 7 for the case of 4 carrier frequencies.

FIG. 7 illustrates a distinctive feature of cognitive radio: a dynamic spectrum sharing process, which evolves in time. In effect, the spectrum sharing process satisfies the constraint imposed on cognitive radio by the availability of spectrum holes at a particular geographic location and their possible variability with time. Throughout the spectrum-sharing process, a transmit power controller may keep an account of the bit-loading across the spectrum holes currently in use. In effect, a dynamic spectrum manager and a transmit power controller may work in concert together, thereby providing multiple-access control.

Starting with a set of spectrum holes, which may be detected as described in the above-referenced International (PCT) Patent Application Serial No. PCT/CA2005/001562, and U.S. Provisional Patent Application Ser. No. 60/617,638, it is possible for a dynamic spectrum management algorithm to confront a situation where a prescribed frame-error rate cannot be satisfied. In situations of this kind, the algorithm can do one of two things:

(i) work with a more spectrally efficient modulation strategy; or else
(ii) incorporate the use of one or more other spectrum holes.

In approach (i), the algorithm resorts to increased computational complexity, and in approach (ii), it resorts to increased channel bandwidth so as to maintain communication reliability.

A dynamic spectrum management algorithm may take traffic considerations into account. In a code-division multiple access (CDMA) system like IS-95, for example, there is a phenomenon called cell breathing. Cells in the system effectively shrink and grow over time. Specifically, if a cell has more users, then the interference level tends to increase, which is counteracted by allocating a new incoming user to another cell. That is, the cell coverage is reduced. If, on the other hand, a cell has less users, then the interference level is correspondingly lowered, in which case the cell coverage is allowed to grow by accommodating new users. So in a CDMA system, traffic and interference levels are associated together. In a cognitive radio system based on CDMA, a dynamic spectrum management algorithm naturally focuses on the allocation of users, first to white spaces with low interference levels and then to grey spaces with higher interference levels.

When using other multiple-access techniques, such as OFDM, co-channel interference should be avoided. To achieve this goal, a dynamic-spectrum management algorithm may include a traffic model of the primary user occupying a portion of the spectrum. The traffic model, which could be built on historical data, provides a basis for predicting future traffic patterns in that portion of the spectrum, which in turn makes it possible to predict the duration for which a spectrum hole vacated by a primary user is likely to be available for use by a cognitive radio operator.

In a wireless environment, two classes of traffic data pattern are distinguished, including deterministic patterns and stochastic patterns. In a deterministic traffic pattern, the primary user (e.g., TV transmitter, radar transmitter) is assigned a fixed time slot for transmission. When it is switched OFF, the frequency band is vacated and can therefore be used by a cognitive radio operator. Stochastic patterns, on the other hand, can only be described in statistical terms. Typically, the arrival times of data packets are modeled as a Poisson process, while the service times are modeled as uniformly distributed or Poisson distributed, depending on whether the data are packet-switched or circuit-switched, respectively. In any event, the model parameters of stochastic traffic data vary slowly, and therefore lend themselves to on-line estimation using historical data. Moreover, by building a tracking strategy into design of the predictive model, the accuracy of the model can be further improved.

What has been described is merely illustrative of the application of the principles of the invention. Other arrangements and methods can be implemented by those skilled in the art without departing from the scope of the present invention.

For example, it may be useful to consider possible emergent behavior of cognitive radio.

The cognitive radio environment is naturally time varying. Most important, it exhibits a unique combination of characteristics including, among others, adaptivity, awareness, cooperation, competition, and exploitation. Given these characteristics, we may wonder about the emergent behavior of a cognitive radio environment in light of what we know on two relevant fields: self-organizing systems, and evolutionary games.

First, we note that the emergent behavior of a cognitive radio environment viewed as a game, is influenced by the degree of coupling that may exist between the actions of different players (i.e., transmitters) operating in the game. The coupling may have the effect of amplifying local perturbations in a manner analogous with Hebb's postulate of learning, which accounts for self-amplification in self-organizing systems. Clearly, if they are left unchecked, the amplifications of local perturbations would ultimately lead to instability. From the study of self-organizing systems, we know that competition among the constituents of such a system can act as a stabilizing force. By the same token, we expect that competition among the users of cognitive radio for limited resources (e.g., spectrum holes) may have the influence of a stabilizer.

For additional insight, we next look to evolutionary games. The idea of evolutionary games, developed for the study of ecological biology, was first introduced by Maynard Smith in 1974. In his landmark works (J. Maynard Smith, "The Theory or Games and the Evolution of Animal Conflicts", J. Theoretical Biology, vol. 47, pp. 209-221, 1974, and J. Maynard Smith, Evolution and the Theory of Games, Cambridge University Press, 1982), Maynard Smith wondered whether the theory of games could serve as a tool for modeling conflicts in a population of animals. In specific terms, two critical insights into the emergence of so-called evolutionary stable strategies were presented by Maynard Smith, as succinctly summarized in P. W. Glimcher, *Decisions, Uncertainty, and the Brain: The science of neuroeconomics*, MIT Press, 2003 and H. G. Schuster, *Complex Adaptive Systems An Introduction*, Springer-Verlag, 2001:

The animals' behavior is stochastic and unpredictable, when it is viewed at the microscopic level of individual acts.

The theory of games provides a plausible basis for explaining the complex and unpredictable patterns of the animals' behavior.

Two key issues are raised here:

1. Complexity. The new sciences of complexity may well occupy much of the intellectual activity in the 21st century. In the context of complexity, it is perhaps less ambiguous to speak of complex behavior rather than complex systems. A nonlinear dynamic system may be complex in computational terms but incapable of exhibiting complex behavior. By the same token, a nonlinear system can be simple in computational terms but its underlying dynamics are rich enough to produce complex behavior. The emergent behavior of an evolutionary game may be complex, in the sense that a change in one or more of the parameters in the underlying dynamics of the game can produce a dramatic change in behavior. Note that the dynamics must be nonlinear for complex behavior to be possible.

2. Unpredictability. Game theory does not require that animals be fundamentally unpredictable. Rather, it merely requires that the individual behavior of each animal be unpredictable with respect to its opponents.

From this brief discussion on evolutionary games, we may conjecture that the emergent behavior of a multi-user cognitive radio environment is explained by the unpredictable action of each user, as seen individually by the other users (i.e., opponents).

Moreover, given the conflicting influences of cooperation, competition, and exploitation on the emergent behavior of a cognitive radio environment, we may identify two possible end-results:

(i) Positive emergent behavior, which is characterized by order, and therefore a harmonious and efficient utilization of the radio spectrum by all users of the cognitive radio. The positive emergent behavior may be likened to Maynard Smith's evolutionary stable strategy.

(ii) Negative emergent behavior, which is characterized by disorder, and therefore a culmination of traffic jams, chaos, and unused radio spectrum. The possibility of characterizing negative emergent behavior as a chaotic phenomenon needs some explanation. Idealized chaos theory is based on the premise that dynamic noise in a state-space model describing the phenomenon of interest is zero. However, it is unlikely that this highly restrictive condition is satisfied by real-life physical phenomena. So, the proper thing to say is that it is feasible for a negative emergent behavior to be stochastic chaotic.

From a practical perspective, what we need are, first, a reliable criterion for the early detection of negative emergent behavior (i.e., disorder) and, second, corrective measures for dealing with this undesirable behavior. With regards to the first issue, we recognize that cognition, in a sense, is an exercise in assigning probabilities to possible behavioral responses. In light of this, it may be said that in the case of positive emergent behavior, predictions are possible with nearly complete confidence. On the other hand, in the case of negative emergent behavior, predictions are made with far less confidence. We may thus think of a likelihood function based on predictability as a criterion for the onset of negative emergent behavior. In particular, we envision a maximum-likelihood detector, the design of which is based on the predictability of negative emergent behavior.

Cognitive radio holds the promise of a new frontier in wireless communications. Specifically, with dynamic coordination of a spectrum sharing process, significant "white space" can be created in the spectrum, which in turn makes it possible to improve spectrum utilization under constantly changing user conditions. The dynamic spectrum sharing capability builds on two matters:

(i) a paradigm shift in wireless communications from transmitter-centricity to receiver-centricity, whereby interference power rather than transmitter emission is regulated; and (ii) awareness of and adaptation to the environment by the radio.

Cognitive radio is a computer-intensive system, so much so that we may think of it as a radio with a computer inside or a computer that transmits. Such a system provides a novel basis for balancing the communication and computing needs of a user against those of a network with which the user would like to operate. With so much reliance on computing, language understanding may play a key role in the organization of domain knowledge for the cognitive cycle, which may include any or all of the following:

(i) a wake cycle, as shown in FIG. 1, during which the cognitive radio supports the tasks of passive radio-scene analysis, active transmit-power control and dynamic spectrum management, and possibly other tasks such as channel-state estimation and predictive modeling;

(ii) a sleep cycle, during which incoming stimuli are integrated into the domain knowledge of a "personal digital assistant"; and (iii) a prayer cycle, which caters to items that cannot be dealt with during the sleep cycle and may therefore be resolved through interaction of the cognitive radio with the user in real time.

It is widely recognized that the use of a MIMO antenna architecture can provide for a spectacular increase in the spectral efficiency of wireless communications. With improved spectrum utilization as one of the primary objectives of cognitive radio, it seems logical to explore building the MIMO antenna architecture into the design of cognitive radio. The end result is a cognitive MIMO radio that offers the ultimate in flexibility, which is exemplified by four degrees of freedom: carrier frequency, channel bandwidth, transmit power, and multiplexing gain.

Turbo processing has established itself as one of the key technologies for modern digital communications. In specific terms, turbo processing has made it possible to provide significant improvements in the signal processing operations of channel decoding and channel equalization, both of which are basic to the design of digital communication systems. Compared to traditional design methodologies, these improvements manifest themselves in spectacular reductions in frame error rates for prescribed signal-to-noise ratios. It also seems logical to build turbo processing into the design of cognitive radio in order to support Quality of Service (QoS) requirements, for example.

With computing being so central to the implementation of cognitive radio, it is natural that we keep nanotechnology in mind as we look to the future. Since the first observation of multi-walled carbon nanotubes in transmission electron microscopy studies, carbon nanotubes have been explored extensively in theoretical and experimental studies of nanotechnology. Nanotubes offer the potential for a paradigm shift from the narrow confine of today's information processing based on silicon technology to a much broader field of information processing, given the rich electro-mechano-opto-chemical functionalities that are endowed in nanotubes. This paradigm shift may well impact the evolution of cognitive radio in its own way.

The potential for cognitive radio to make a significant difference to wireless communications is immense, hence the reference to it as a disruptive but unobtrusive technology. In the final analysis, however, one key issue that may shape the evolution of cognitive radio in the course of time, be that for civilian or military applications, is trust, which is two-fold, including trust by the users of cognitive radio, and trust by all other users who might be interfered with.

We claim:

1. A method of controlling transmit power in a multi-user wireless communication system, comprising:
   determining a transmit power level for a transmitter in the wireless communication system according to a communication theory algorithm, the communication theory algorithm being based on an assumption of behaviours of transmitters in the communication system;
   monitoring behaviours of the transmitters in the communication system using a learning algorithm, the monitoring comprising determining consistency between the behaviours of the transmitters and the assumption of behaviours; and
   generating an alert where the behaviour of one or more of the transmitters is not consistent with the assumption.

2. The method of claim 1, wherein the communication theory algorithm comprises an iterative water-filling procedure, the iterative water-filling procedure accounting for determined transmit power levels of the transmitter and other transmitters in the communication system.

3. The method of claim 2, wherein the iterative water-filling procedure comprises:
   initializing a transmit power distribution across n transmitters;
   performing water-filling for the transmitter to determine a transmit power level for a target data transmission rate of the transmitter subject to a power constraint for the transmitter and a level of interference, the level of interference comprising a noise floor plus either initialized transmit power levels or previously determined transmit power levels for the other transmitters;
   determining whether a data transmission rate of the transmitter is greater than or less than a target data transmission rate of the transmitter, and if so, adjusting the determined transmit power level for the transmitter;
   determining whether a target data transmission rate of at least one of the n transmitters is not satisfied by a respective adjusted transmit power level for the at least one transmitter, and repeating the operation of performing water-filling where the target data transmission rate of at least one of the n transmitters is not satisfied.

4. The method of claim 3, wherein the operations of performing, determining whether a data transmission rate of a transmitter is greater than or less than a target transmission rate, and adjusting are repeated for each of the other transmitters, wherein determining whether the target data transmission rate of at least one of the n transmitters is not satisfied comprises determining whether the target data transmission rates of all of the n transmitters are not satisfied, and wherein repeating the operation of performing water-filling comprises repeating the operation of performing water-filling where the target data transmission rates of all of the n transmitters are not satisfied.

5. The method of claim 3, wherein adjusting comprises reducing the determined transmit power level for the transmitter where the data transmission rate of the transmitter is greater than the target data transmission rate of the transmitter, and wherein, where the data transmission rate of the transmitter is less than the target data transmission rate of the transmitter, adjusting comprises:
   determining whether increasing the determined transmit power level of the transmitter would violate an interference level limit; and
   increasing the determined transmit power level of the transmitter where increasing the determined transmit power level of the transmitter would not violate an interference level limit.

6. The method of claim 1, wherein the learning algorithm comprises a regret-conscious learning algorithm or a Lagrangian learning algorithm.

7. A non-transitory machine-readable medium storing instructions which when executed perform the method of claim 1.

8. A method of controlling transmit power in a multi-user wireless communication system, comprising:

determining a transmit power level for a transmitter in the wireless communication system according to a communication theory algorithm, the communication theory algorithm being based on an assumption of behaviours of transmitters in the communication system;

monitoring behaviours of the transmitters in the communication system using a learning algorithm; and detecting at least one spectrum hole, wherein determining comprises determining a transmit power level for the transmitter for transmission within the at least one spectrum hole.

9. The method of claim 8, further comprising:

predicting subsequent availability of the at least one spectrum hole; and repeating the operations of determining and monitoring when the at least one spectrum hole is predicted to become unavailable.

10. The method of claim 8, further comprising:

detecting a further spectrum hole;

detecting an increase in interference in the at least one spectrum hole; and repeating the operations of determining and monitoring to control transmit power levels for the transmitter for transmission within the further spectrum hole responsive to detecting an increase in interference in the at least one spectrum hole.

11. A method of controlling transmit power in a multi-user wireless communication system, comprising:

determining a transmit power level for a transmitter in the wireless communication system according to a communication theory algorithm, the communication theory algorithm being based on an assumption of behaviours of transmitters in the communication system;

monitoring behaviours of the transmitters in the communication system using a learning algorithm;

determining a position of the transmitter relative to other transmitters in the communication system; and determining a multi-user path loss matrix of the operating environment of the transmitter based on the determined position of the transmitter relative to the other transmitters.

12. A method of controlling transmit power in a multi-user wireless communication system, comprising:

determining a transmit power level for a transmitter in the wireless communication system according to a communication theory algorithm, the communication theory algorithm being based on an assumption of behaviours of transmitters in the communication system;

monitoring behaviours of the transmitters in the communication system using a learning algorithm, wherein the communication theory algorithm comprises an iterative water-filling procedure, the iterative water-filling procedure accounting for determined transmit power levels of the transmitter and other transmitters in the communication system, wherein the iterative water-filling procedure comprises:

initializing a transmit power distribution across n transmitters;

performing water-filling for the transmitter to determine a transmitpower level for a target data transmission rate of the transmitter subject to a power constraint for the transmitter and a level of interference, the level of interference comprising a noise floor plus either initialized transmit power levels or previously determined transmit power levels for the other transmitters;

determining whether a data transmission rate of the transmitter is greater than or less than a target data transmission rate of the transmitter, and if so, adjusting the determined transmit power level for the transmitter; and determining whether a target data transmission rate of at least one of the n transmitters is not satisfied by a respective adjusted transmit power level for the at least one transmitter, and repeating the operation of performing water-filling where the target data transmission rate of at least one of the n transmitters is not satisfied, wherein adjusting comprises reducing the determined transmit power level for the transmitter where the data transmission rate of the transmitter is greater than the target data transmission rate of the transmitter, and wherein, where the data transmission rate of the transmitter is less than the target data transmission rate of the transmitter, adjusting comprises:

determining whether increasing the determined transmit power level of the transmitter would violate an interference level limit; and increasing the determined transmit power level of the transmitter where increasing the determined transmit power level of the transmitter would not violate an interference level limit, the method further comprising:

adapting a modulation strategy for transmission of data by the transmitter where the data transmission rate of the transmitter is less than the target data transmission rate of the transmitter and increasing the determined transmit power level of the transmitter would violate an interference level limit.

13. A method of controlling transmit power in a multi-user wireless communication system, comprising:

determining a transmit power level for a transmitter in the wireless communication system according to a communication theory algorithm, the communication theory algorithm being based on an assumption of behaviours of transmitters in the communication system;

monitoring behaviours of the transmitters in the communication system using a learning algorithm, wherein the communication theory algorithm comprises an iterative water-filling procedure, the iterative water-filling procedure accounting for determined transmit power levels of the transmitter and other transmitters in the communication system, wherein the iterative water-filling procedure comprises:

initializing a transmit power distribution across n transmitters;

performing water-filling for the transmitter to determine a transmit power level for a target data transmission rate of the transmitter subject to a power constraint for the transmitter and a level of interference, the level of interference comprising a noise floor plus either initialized transmit power levels or previously determined transmit power levels for the other transmitters;

determining whether a data transmission rate of the transmitter is greater than or less than a target data transmission rate of the transmitter, and if so, adjusting the determined transmit power level for the transmitter; and determining whether a target data transmission rate of at least one of the n transmitters is not satisfied by a respective adjusted transmit power level for the at least one transmitter, and repeating the operation of performing water-filling where the target data transmission rate of at least one of the n transmitters is not satisfied, wherein adjusting comprises reducing the determined transmit power level for the transmitter where the data transmission rate of the transmitter is greater than the target data transmission rate of the transmitter, and wherein, where the data transmission rate of the transmitter is less than the target data transmission rate of the transmitter, adjusting comprises:
  determining whether increasing the determined transmit power level of the transmitter would violate an interference level limit; and
  increasing the determined transmit power level of the transmitter where increasing the determined transmit power level of the transmitter would not violate an interference level limit,
  wherein determining whether increasing the determined transmit power level of the transmitter would violate an interference level limit comprises determining whether increasing the determined transmit power level of the transmitter would violate an interference level limit within a spectrum hole, the method further comprising, where the data transmission rate of the transmitter is less than the target data transmission rate of the transmitter and increasing the determined transmit power level of the transmitter would violate an interference level limit within the spectrum hole;
  detecting a further spectrum hole; and
  determining a further transmit power level for the transmitter for transmission within the new spectrum hole.

14. A system for controlling transmit power in a multi-user wireless communication system, comprising:
  an input for receiving information associated with transmit behaviours of transmitters in the wireless communication system; and
  a processor operatively coupled to the input and configured to determine a transmit power level for a transmitter in the wireless communication system according to a communication theory algorithm, the communication theory algorithm being based on an assumption of transmit behaviours of transmitters in the communication system, and to monitor the transmit behaviours of the transmitters in the communication system using a learning algorithm, the processor being configured to monitor the transmit behaviours of the transmitters by determining consistency between the behaviours of the transmitters and the assumption of behaviours, and wherein the processor is further configured to generate an alert where the behaviour of one or more of the transmitters is not consistent with the assumption.

15. The system of claim 14, wherein the processor is further configured to implement a cognitive radio.

16. The system of claim 14, wherein the communication theory algorithm comprises an iterative water-filling procedure, the iterative water-filling procedure accounting for determined transmit power levels of the transmitter and other transmitters in the communication system.

17. The system of claim 14, wherein the processor is configured to determine a transmit power level for the transmitter by:
  initializing a transmit power distribution across n transmitters;
  performing water-filling for the transmitter to determine a transmit power level for a target data transmission rate of the transmitter subject to a power constraint for the transmitter and a level of interference, the level of interference comprising a noise floor plus either initialized transmit power levels or previously determined transmit power levels for the other transmitters;
  determining whether a data transmission rate of the transmitter is greater than or less than a target data transmission rate of the transmitter, and if so, adjusting the determined transmit power level for the transmitter;
  determining whether a target data transmission rate of at least one of the n transmitters is not satisfied by a respective adjusted transmit power level for the at least one transmitter, and repeating the operation of performing water-filling where the target data transmission rate of at least one of the n transmitters is not satisfied.

18. The system of claim 17, wherein the processor is further configured to determine whether the target data transmission rate of at least one of the n transmitters is not satisfied by determining whether the target data transmission rates of all of the n transmitters are not satisfied, and to repeat the operation of performing water-filling where the target data transmission rates of all of the n transmitters are not satisfied.

19. The system of claim 17, wherein the processor is configured to adjust the determined transmit power level by reducing the determined transmit power level for the transmitter where the data transmission rate of the transmitter is greater than the target data transmission rate of the transmitter, and is further configured to adjust the determined transmit power level by:
  determining whether increasing the determined transmit power level of the transmitter would violate an interference level limit, where the data transmission rate of the transmitter is less than the target data transmission rate of the transmitter; and
  increasing the determined transmit power level of the transmitter where increasing the determined transmit power level of the transmitter would not violate an interference level limit.

20. The system of claim 14, wherein the learning algorithm comprises a regret-conscious learning algorithm or a Lagrangian learning algorithm.

21. A system for controlling transmit power in a multi-user wireless communication system, comprising:
  an input for receiving information associated with transmit behaviours of transmitters in the wireless communication system; and
  processor operatively coupled to the input and configured to determine a transmit power level for a transmitter in the wireless communication system according to a communication theory algorithm, the communication theory algorithm being based on an assumption of transmit behaviours of transmitters in the communication system, and to monitor the transmit behaviours of the transmitters in the communication system using a learning algorithm, the processor being further configured to detect at least one spectrum hole, and to determine a transmit power level by determining a transmit power level for the transmitter for transmission within the at least one spectrum hole.

22. The system of claim 21, wherein the at least one spectrum hole comprises a plurality of spectrum holes, and wherein the processor is configured to determine a transmit power level by determining a set of transmit power levels comprising multiple transmit power levels for transmission within respective ones of the plurality of spectrum holes.

23. The system of claim 21, wherein the processor is further configured to predict subsequent availability of the at least one spectrum hole, and to repeat the operations of determining and adapting when the at least one spectrum hole is predicted to become unavailable.

24. The system of claim 21, wherein the processor is further configured to detect a further spectrum hole, to detect an increase in interference in the at least one spectrum hole, and to repeat the operations of determining and adapting to control transmit power levels for the transmitter for transmission within the further spectrum hole responsive to detecting an increase in interference in the at least one spectrum hole.

25. A system for controlling transmit power in a multi-user wireless communication system, comprising:
  an input for receiving information associated with transmit behaviours of transmitters in the wireless communication system; and
  a processor operatively coupled to the input and configured to determine a transmit power level for a transmitter in the wireless communication system according to a communication theory algorithm, the communication theory algorithm being based on an assumption of transmit behaviours of transmitters in the communication system, and to monitor the transmit behaviours of the transmitters in the communication system using a learning algorithm, the processor being further configured to determine a position of the transmitter relative to the other users, and to determine a multi-user path loss matrix of the operating environment of the transmitter based on the determined position of the transmitter relative to the other transmitters.

26. A system for controlling transmit power in a multi-user wireless communication system, comprising:
  an input for receiving information associated with transmit behaviours of transmitters in the wireless communication system; and
  a processor operatively coupled to the input and configured to determine a transmit power level for a transmitter in the wireless communication system according to a communication theory algorithm, the communication theory algorithm being based on an assumption of transmit behaviours of transmitters in the communication system, and to monitor the transmit behaviours of the transmitters in the communication system using a learning algorithm,
  the processor being configured to determine a transmit power level for the transmitter by:
  initializing a transmit power distribution across n transmitters;
  performing water-filling for the transmitter to determine a transmit power level for a target data transmission rate of the transmitter subject to a power constraint for the transmitter and a level of interference, the level of interference comprising a noise floor plus either initialized, transmit power levels or previously determined transmit power levels for the other transmitters;
  determining whether a data transmission rate of the transmitter is greater than or less than a target data transmission rate of the transmitter, and if so, adjusting the determined transmit power level for the transmitter; and
  determining whether a target data transmission rate of at least one of the n transmitters is not satisfied by a respective adjusted transmit power level for the at least one transmitter, and repeating the operation of performing water-filling where the target data transmission rate of at least one of the n transmitters is not satisfied,
  the processor being configured to adjust the determined transmit power level by reducing the determined transmit power level for the transmitter where the data transmission rate of the transmitter is greater than the target data transmission rate of the transmitter, and is further configured to adjust the determined transmit power level by:
  determining whether increasing the determined transmit power level of the transmitter would violate an interference level limit, where the data transmission rate of the transmitter is less than the target data transmission rate of the transmitter; and
  increasing the determined transmit power level of the transmitter where increasing the determined transmit power level of the transmitter would not violate an interference level limit,
  the processor being further configured to adapt a modulation strategy for transmission of data by the transmitter where the data transmission rate of the transmitter is less than the target data transmission rate of the transmitter and increasing the determined transmit power level of the transmitter would violate an interference level limit.

27. A system for controlling transmit power in a multi-user wireless communication system, comprising:
  an input for receiving information associated with transmit behaviours of transmitters in the wireless communication system; and
  a processor operatively coupled to the input and configured to determine a transmit power level for a transmitter in the wireless communication system according to a communication theory algorithm, the communication theory algorithm being based on an assumption of transmit behaviours of transmitters in the communication system, and to monitor the transmit behaviours of the transmitters in the communication system using a learning algorithm,
  the processor being configured to determine a transmit power level for the transmitter by:
  initializing a transmit power distribution across n transmitters;
  performing water-filling for the transmitter to determine a transmit power level for a target data transmission rate of the transmitter subject to a power constraint for the transmitter and a level of interference, the level of interference comprising a noise floor plus either initialized transmit power levels or previously determined transmit power levels for the other transmitters;
  determining whether a data transmission rate of the transmitter is greater than or less than a target data transmission rate of the transmitter, and if so, adjusting the determined transmit power level for the transmitter; and
  determining whether a target data transmission rate of at least one of the n transmitters is not satisfied by a respective adjusted transmit power level for the at least one transmitter, and repeating the operation of performing water-filling where the target data transmission rate of at least one of the n transmitters is not satisfied,
  the processor being configured to adjust the determined transmit power level by reducing the determined transmit power level for the transmitter where the data transmission rate of the transmitter is greater than the target data transmission rate of the transmitter, and is further configured to adjust the determined transmit power level by:
  determining whether increasing the determined transmit power level of the transmitter would violate an interference level limit, where the data transmission rate of the transmitter is less than the target data transmission rate of the transmitter; and
  increasing the determined transmit power level of the transmitter where increasing the determined transmit power level of the transmitter would not violate an interference level limit,
  the processor being configured to determine whether increasing the determined transmit power level of the transmitter would violate an interference level limit by determining whether increasing the determined transmit power level of the transmitter would violate an interference level limit within a spectrum hole, and wherein the processor is further configured to detect a further spectrum hole and to determine a further transmit power level for the transmitter for transmission within the further spectrum hole, where the data transmission rate of the transmitter is less than the target data transmission rate of the transmitter and increasing the determined transmit power level of the transmitter would violate an interference level limit within the spectrum hole.

* * * * *

UNITED STATES PATENT AND TRADEMARK OFFICE
CERTIFICATE OF CORRECTION

PATENT NO. : 8,060,035 B2  
APPLICATION NO. : 11/577280  
DATED : November 15, 2011  
INVENTOR(S) : Simon Haykin Page 1 of 1

It is certified that error appears in the above-identified patent and that said Letters Patent is hereby corrected as shown below:

Title page, item (57) ABSTRACT

Line 2 "is provided," should read -- is provided.--
Line 3 "transmit power," should read -- transmit power --

Column 11, Line 32 " $\{p_{j,k}\}_{k=1}^{K}$ " should read -- $\{p_{j,k}\}_{k=1}^{K}$ --

Column 11, Line 41 " $q=p_j^T a_j$ for $j=1,2,...,k$ " should read -- $q_j = p_j^T a_j$ for $j = 1, 2, ..., n$ --

Column 13, Line 10 "Let $\tilde{x}_t$," should read -- Let $\hat{\tilde{x}}_t$ --

Column 13, Line 14 "the difference $\vec{e}_t = \vec{x}_t - \vec{x}_{t-1}$." should read -- the difference $\bar{e}_t = \bar{x}_t - \hat{\bar{x}}_{t-1}$ · --

Column 29, Line 60 "transmitpower" should read -- transmit power --

Column 31, Line 21 "spectrum hole;" should read -- spectrum hole: --

Column 32, Line 39 "processor" should read -- a processor --

Column 33, Line 24 "comprising;" should read -- comprising: --

Column 33, Line 46 "initialized," should read -- initialized --

Signed and Sealed this  
Tenth Day of July, 2012

David J. Kappos  
*Director of the United States Patent and Trademark Office*